United States Patent
Markovic et al.

(10) Patent No.: US 9,609,585 B1
(45) Date of Patent: Mar. 28, 2017

(54) DEVICES AND METHOD FOR CELL SEARCH AND DETECTION

(71) Applicant: Intel IP Corporation, Santa Clara, CA (US)

(72) Inventors: Denis Markovic, Nuremberg (DE); Matthew Hayes, Radebeul (DE); Zhibin Yu, Unterhaching (DE); Tianyan Pu, Santa Clara, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/084,521

(22) Filed: Mar. 30, 2016

(51) Int. Cl.
| | |
|---|---|
| *H04B 7/00* | (2006.01) |
| *H04W 48/16* | (2009.01) |
| *H04W 56/00* | (2009.01) |
| *H04W 48/20* | (2009.01) |
| *H04W 4/00* | (2009.01) |
| *H04W 36/00* | (2009.01) |

(52) U.S. Cl.
CPC .......... *H04W 48/16* (2013.01); *H04W 48/20* (2013.01); *H04W 56/0035* (2013.01)

(58) Field of Classification Search
CPC ....... H04W 8/04; H04W 36/08; H04W 36/14; H04W 36/30; H04W 48/16; H04W 48/18; H04W 48/20; H04W 56/0035; H04W 60/00; H04W 92/02

USPC ........................................................ 455/525
See application file for complete search history.

(56) References Cited

U.S. PATENT DOCUMENTS

| | | | |
|---|---|---|---|
| 8,688,112 B2 * | 4/2014 | Shen .................... | H04J 11/0093 370/208 |
| 8,737,998 B2 * | 5/2014 | Siomina .................... | G01S 5/10 455/435.1 |
| 2015/0024746 A1 * | 1/2015 | Adachi ................. | H04W 12/06 455/435.1 |

OTHER PUBLICATIONS

"3rd Generation Partnership Project; Technical Specification Group Radio Access Network; Evolved Universal Terrestrial Radio Access (E-UTRA); Physical channels and modulation (Release 12)", 3GPP TS 36.211 V12.5.0, section 6.11, Mar. 2015, 136pages.

* cited by examiner

*Primary Examiner* — Huy C Ho
(74) *Attorney, Agent, or Firm* — Viering, Jentschura & Partner mbB

(57) ABSTRACT

A communication circuit arrangement may include a cell search circuit configured to compare a detected synchronization sequence of a detected candidate cell with a predetermined reference synchronization sequence to generate a demodulated synchronization sequence including a plurality of samples, determine a phase variance between the plurality of samples of the demodulated synchronization sequence, and compare the phase variance to a detection threshold to classify the detected candidate cell as a real cell or a false cell.

25 Claims, 12 Drawing Sheets

FIG. 7

Table 6.11.2.1-1: Mapping between physical-layer cell-identity group $N_{ID}^{(1)}$ and the indices $m_0$ and $m_1$

| $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ |
|---|---|---|---|---|---|---|---|---|---|---|---|---|---|---|
| 0 | 0 | 1 | 34 | 4 | 6 | 68 | 9 | 12 | 102 | 15 | 19 | 136 | 22 | 27 |
| 1 | 1 | 2 | 35 | 5 | 7 | 69 | 10 | 13 | 103 | 16 | 20 | 137 | 23 | 28 |
| 2 | 2 | 3 | 36 | 6 | 8 | 70 | 11 | 14 | 104 | 17 | 21 | 138 | 24 | 29 |
| 3 | 3 | 4 | 37 | 7 | 9 | 71 | 12 | 15 | 105 | 18 | 22 | 139 | 25 | 30 |
| 4 | 4 | 5 | 38 | 8 | 10 | 72 | 13 | 16 | 106 | 19 | 23 | 140 | 0 | 6 |
| 5 | 5 | 6 | 39 | 9 | 11 | 73 | 14 | 17 | 107 | 20 | 24 | 141 | 1 | 7 |
| 6 | 6 | 7 | 40 | 10 | 12 | 74 | 15 | 18 | 108 | 21 | 25 | 142 | 2 | 8 |
| 7 | 7 | 8 | 41 | 11 | 13 | 75 | 16 | 19 | 109 | 22 | 26 | 143 | 3 | 9 |
| 8 | 8 | 9 | 42 | 12 | 14 | 76 | 17 | 20 | 110 | 23 | 27 | 144 | 4 | 10 |
| 9 | 9 | 10 | 43 | 13 | 15 | 77 | 18 | 21 | 111 | 24 | 28 | 145 | 5 | 11 |
| 10 | 10 | 11 | 44 | 14 | 16 | 78 | 19 | 22 | 112 | 25 | 29 | 146 | 6 | 12 |
| 11 | 11 | 12 | 45 | 15 | 17 | 79 | 20 | 23 | 113 | 26 | 30 | 147 | 7 | 13 |
| 12 | 12 | 13 | 46 | 16 | 18 | 80 | 21 | 24 | 114 | 0 | 5 | 148 | 8 | 14 |
| 13 | 13 | 14 | 47 | 17 | 19 | 81 | 22 | 25 | 115 | 1 | 6 | 149 | 9 | 15 |
| 14 | 14 | 15 | 48 | 18 | 20 | 82 | 23 | 26 | 116 | 2 | 7 | 150 | 10 | 16 |
| 15 | 15 | 16 | 49 | 19 | 21 | 83 | 24 | 27 | 117 | 3 | 8 | 151 | 11 | 17 |
| 16 | 16 | 17 | 50 | 20 | 22 | 84 | 25 | 28 | 118 | 4 | 9 | 152 | 12 | 18 |
| 17 | 17 | 18 | 51 | 21 | 23 | 85 | 26 | 29 | 119 | 5 | 10 | 153 | 13 | 19 |
| 18 | 18 | 19 | 52 | 22 | 24 | 86 | 27 | 30 | 120 | 6 | 11 | 154 | 14 | 20 |
| 19 | 19 | 20 | 53 | 23 | 25 | 87 | 0 | 4 | 121 | 7 | 12 | 155 | 15 | 21 |
| 20 | 20 | 21 | 54 | 24 | 26 | 88 | 1 | 5 | 122 | 8 | 13 | 156 | 16 | 22 |
| 21 | 21 | 22 | 55 | 25 | 27 | 89 | 2 | 6 | 123 | 9 | 14 | 157 | 17 | 23 |
| 22 | 22 | 23 | 56 | 26 | 28 | 90 | 3 | 7 | 124 | 10 | 15 | 158 | 18 | 24 |
| 23 | 23 | 24 | 57 | 27 | 29 | 91 | 4 | 8 | 125 | 11 | 16 | 159 | 19 | 25 |
| 24 | 24 | 25 | 58 | 28 | 30 | 92 | 5 | 9 | 126 | 12 | 17 | 160 | 20 | 26 |
| 25 | 25 | 26 | 59 | 0 | 3 | 93 | 6 | 10 | 127 | 13 | 18 | 161 | 21 | 27 |
| 26 | 26 | 27 | 60 | 1 | 4 | 94 | 7 | 11 | 128 | 14 | 19 | 162 | 22 | 28 |
| 27 | 27 | 28 | 61 | 2 | 5 | 95 | 8 | 12 | 129 | 15 | 20 | 163 | 23 | 29 |
| 28 | 28 | 29 | 62 | 3 | 6 | 96 | 9 | 13 | 130 | 16 | 21 | 164 | 24 | 30 |
| 29 | 29 | 30 | 63 | 4 | 7 | 97 | 10 | 14 | 131 | 17 | 22 | 165 | 0 | 7 |
| 30 | 0 | 2 | 64 | 5 | 8 | 98 | 11 | 15 | 132 | 18 | 23 | 166 | 1 | 8 |
| 31 | 1 | 3 | 65 | 6 | 9 | 99 | 12 | 16 | 133 | 19 | 24 | 167 | 2 | 9 |
| 32 | 2 | 4 | 66 | 7 | 10 | 100 | 13 | 17 | 134 | 20 | 25 | - | - | - |
| 33 | 3 | 5 | 67 | 8 | 11 | 101 | 14 | 18 | 135 | 21 | 26 | - | - | - |

DEVICES AND METHOD FOR CELL SEARCH AND DETECTION

TECHNICAL FIELD

Various embodiments relate generally to devices and methods for cell search and detection.

BACKGROUND

Mobile cell search procedures may rely on detection of synchronization sequences in downlink signals to both identify and obtain synchronization with proximate cells. For example, in a Long Term Evolution (LTE) context as specified by the 3$^{rd}$ Generation Partnership Project (3GPP) a mobile terminal may need to detect and identify Primary Synchronization Signal (PSS) and Secondary Synchronization Signal (SSS) sequences in downlink signals received from nearby cells. A mobile terminal may subsequently be able to obtain cell parameters such as cell identity (Physical Cell Identity, PCI), cyclic prefix length (CP, extended or normal), duplex mode (Time Division Duplexing, TDD, or Frequency Division Duplexing, FDD), and timing synchronization based on identification of such synchronization sequences. Mobile terminals may then proceed to utilize these cell parameters in essential mobility procedures, such as measurement reporting, network selection, cell selection and reselection, and handover.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 7 shows a table defining synchronization sequence parameters;

DESCRIPTION

Figure 1:
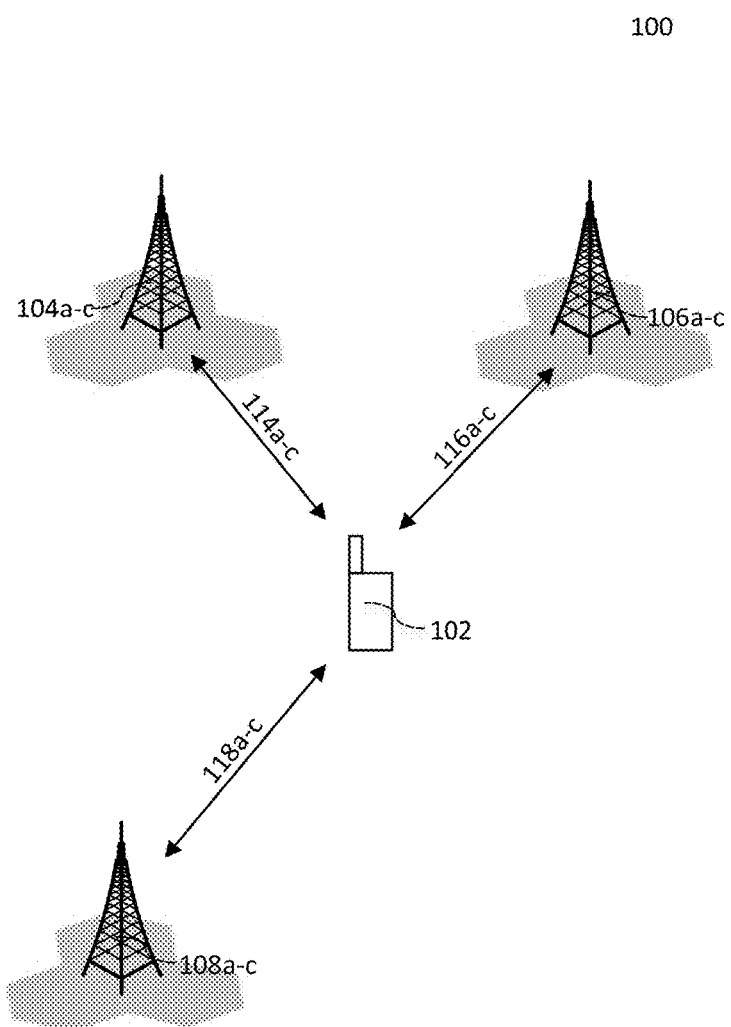
FIG. 1 shows a mobile communication network.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeBs (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include GSM, UMTS, LTE, LTE-Advanced (LTE-A), CDMA, WCDMA, General Packet Radio Service (GPRS), Enhanced Data Rates for GSM Evolution (EDGE), High Speed Packet Access (HSPA), HSPA Plus (HSPA+), and other similar radio communication technologies. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network (RAN) section) and a core section of a network (e.g. a core network section). As utilized herein, the term "radio idle mode" or "radio idle state" used in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct and indirect transmission. Similarly, the term "receive" encompasses both direct and indirect reception unless explicitly specified. The term "communicate" encompasses one or both of transmitting and receiving, i.e. unidirectional or bidirectional communication in one or both of the incoming and outgoing directions.

Cell search may be a vital first step in various cellular mobility procedures including measurement reporting, network selection, cell selection/reselection, and handover. For cell search in an LTE context, a mobile terminal may receive downlink signals on one or more frequency layers and process the received downlink signals to identify the presence of synchronization sequences such as PSS and SSS sequences transmitted by nearby cells. Mobile terminals may then identify and establish synchronization with detectable cells by identifying the PSS and SSS sequences.

As each cell may not align its transmission schedule in time with other cells, a mobile terminal may not have prior knowledge of the timing locations of synchronization sequences transmitted by proximate cells. A mobile terminal may thus need to capture a block of downlink signal data that has a duration at least equal to the synchronization sequence transmission period, e.g. 5 ms (a single half-frame) for PSS and SSS in an LTE context and subsequently process the 5 ms block of downlink data to detect the presence of any synchronization sequences. The mobile terminal may then identify proximate cells based on the detected synchronization sequences.

Specifically, a mobile terminal may calculate the cross-correlation in the time domain between a captured search probe (window of search data) and each of a predefined set of possible PSS sequences to identify potential timing locations of PSS sequences in the search probe. The mobile terminal may then use identified potential PSS timing locations for symbol timing to convert the captured search probe into the frequency domain and subsequently perform frequency-domain cross-correlation with each of a predefined set of possible SSS sequences to identify a transmitted SSS in the captured search probe. By identifying a match between the captured search probe and a PSS-SSS pair from the predefined sets of possible PSS and SSS sequences, a mobile terminal may obtain the identity of a candidate cell. A mobile terminal may identify multiple such matches at varying time points within the capture search probe at with different PSS-SSS pairs, and accordingly may obtain a list of candidate cells.

However, random channel effects and special properties of the synchronization sequences may lead to mistakes in an obtained list of candidate cells. For example, a mobile terminal may mistakenly detect a match within a search probe that does not correspond to a real cell, i.e. may detect a "ghost cell" (also referred to herein as a "false cell"), or may fail to detect a real cell within a search probe. Accordingly, a mobile terminal may obtain a list of candidate cells that mistakenly includes ghost cells (i.e. that should not have been detected in the search probe) and/or does not include real cells (i.e. that should have been detected in the search probe).

In order to correct such detection errors, a mobile terminal may apply cell classification to evaluate each candidate cell to identify and discard ghost cells. An effective cell classification procedure may thus accurately identify ghost cells without mistakenly characterizing real cells as ghost cells. These cell classification procedures may perform additional processing on captured search probes (i.e. following the initial evaluation stage to identify matching PSS-SSS pairs) in order to evaluate an initial list of candidate cells and subsequently filter out ghost cells to produce a final list of real cells.

As previously indicated, a mobile terminal may receive a block of downlink data, i.e. e.g. a 5 ms search probe, and process the downlink data in order to detect nearby cells. Depending on the location of the mobile terminal, a search probe may include detectable contributions from various proximate cells. FIG. 1 shows an exemplary scenario in which mobile terminal 102 is located proximate to base stations 104, 106, and 108. Each of base stations 104-108 may be sectorized (e.g. with sectorized antenna systems) and accordingly composed of multiple "sectors" or "cells", such as cells 104a, 104b, and 104c for base station 104, cells 106a, 106b, and 106c for base station 106, and cells 108a, 108b, and 108c for base station 108. The wireless channels 114a-114c, 116a-116c, and 118a-118c may represent the discrete wireless channels between each of respective cells 104a-104c, 106a-106c, and 108a-108c.

Figure 2:
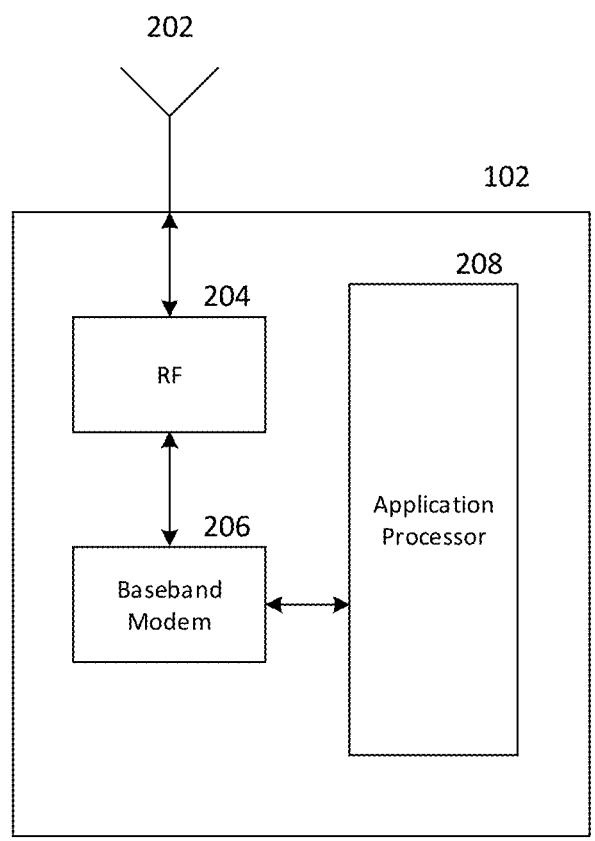
FIG. 2 shows an internal configuration of a mobile terminal.

FIG. 2 shows an internal configuration of mobile terminal 102. As shown in FIG. 2, mobile terminal 102 may include antenna system 202, RF transceiver 204, baseband modem 206, and application processor 208. Mobile terminal 102 may have one or more additional components not explicitly depicted in FIG. 2, such as additional hardware, software, or firmware elements including processors/microprocessors, controllers/microcontrollers, memory, other specialty or generic hardware/processors/circuits, etc., in order to support a variety of additional operations. Mobile terminal 102 may also include a variety of user input/output devices (display(s), keypad(s), touchscreen(s), speaker(s), external button(s), camera(s), microphone(s), etc.), peripheral device (s), memory, power supply, external device interface(s), subscriber identify module(s) (SIM) etc.

In an abridged overview of the operation of mobile terminal 102, mobile terminal 102 may be configured to receive and/or transmit wireless signals according to one or more wireless access protocols or radio access technologies (RATs), including any one or combination of LTE, WLAN, WiFi, UMTS, GSM, Bluetooth, CDMA, WCDMA, etc. The RAT capabilities of mobile terminal 102 may be determined by one or more Subscriber Identity Modules (SIM) included in mobile terminal 102 (not explicitly shown in FIG. 2). It is appreciated that separate components may be provided for each distinct type of compatible wireless signals, such as a dedicated LTE antenna, LTE RF transceiver, and dedicated LTE baseband modem for LTE reception and transmission, a dedicated UMTS antenna, UMTS RF transceiver and UMTS baseband modem, a dedicated Wifi antenna, WiFi RF transceiver, and WiFi baseband modem for WiFi reception and transmission, etc., in which case antenna 202, RF transceiver 204, and baseband modem 206 may each respectively be an antenna system, RF transceiver system, and a baseband modem system composed of the individual dedicated components. Alternatively, one or more components of mobile terminal 102 may be shared between different wireless access protocols, such as e.g. by sharing antenna 202 between multiple different wireless access protocols, e.g. by using a common RF transceiver 204 shared between multiple wireless access protocols, e.g. a common baseband modem 206 shared between multiple wireless access protocols, etc. In an exemplary aspect of disclosure, RF transceiver 204 and/or baseband modem 206 may be operate according to multiple mobile communication access protocols (i.e. "multi-mode"), and thus may be configured to support one or more of LTE, UMTS, and/or GSM access protocols.

Further to the abridged overview of operation of mobile terminal 102, RF transceiver 204 may receive radio frequency wireless signals via antenna 202, which may be implemented as e.g. a single antenna or an antenna array composed of multiple antennas. RF transceiver 204 may include various reception circuitry components, which may include analog circuitry configured to process externally received signals such as e.g. mixing circuitry to convert externally received RF signals to baseband and/or intermediate frequencies. RF transceiver 204 may also include amplification circuitry to amplify externally received signals, such as power amplifiers (PAs) and/or Low Noise Amplifiers (LNAs), although it is appreciated that such components may also be implemented separately from RF transceiver 204. RF transceiver 204 may additionally include various transmission circuitry components configured to transmit internally received signals, such as e.g. baseband and/or intermediate frequency signals provided by baseband modem 206, which may include mixing circuitry to modulate internally received signals onto one or more radio frequency carrier waves and/or amplification circuitry to amplify internally received signals before transmission. RF transceiver 204 may provide such signals to antenna 202 for wireless transmission. Further references herein to reception and/or transmission of wireless signals by mobile terminal 102 may thus be understood as an interaction between antenna 202, RF transceiver 204, and baseband modem 206 as detailed above. Although not explicitly depicted in FIG. 2, RF transceiver 204 may be additionally be connected to application processor 208.

Figure 3:
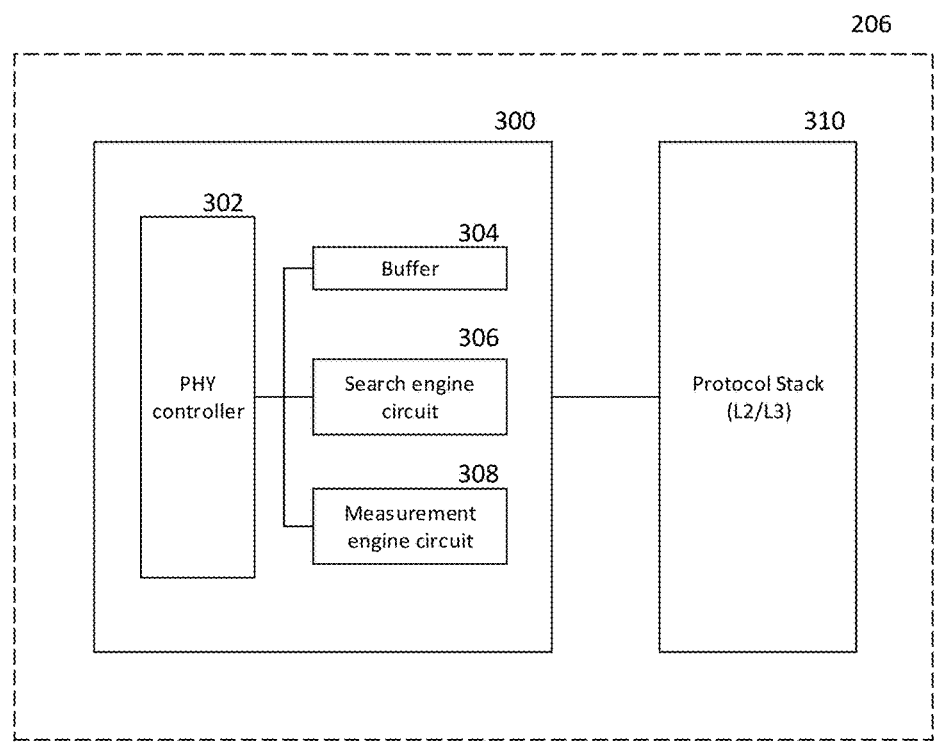
FIG. 3 shows an internal configuration of a baseband modem of a mobile terminal.

FIG. 3 depicts an internal configuration of baseband modem 206. As shown in FIG. 3, baseband modem 206 may be composed of a physical layer (PHY, Layer 1) subsystem 300 and a protocol stack (Layers 2 and 3) subsystem 310. Although not explicitly shown in FIG. 3, baseband modem 206 may additionally include various additional baseband processing circuitry, such as Analog to Digital Converters (ADCs) and/or Digital to Analog Converters (DACs), modulation/demodulation circuitry, encoding/decoding circuitry, audio codec circuitry, digital signal processing circuitry, etc.

Baseband modem 206 may be responsible for mobile communication functions of mobile terminal 102, and may be configured to operate in conjunction with RF transceiver 204 and antenna system 202 to transmit and receive mobile communication signals in accordance with various mobile communication protocols. Baseband modem 206 may be responsible for various baseband signal processing operations for both uplink and downlink signal data. Accordingly, baseband modem 206 may obtain and buffer baseband downlink and uplink signals and subsequently provide the buffered downlink signals to various internal components of baseband modem 206 for respective processing operations.

PHY subsystem 300 may be configured to perform control and processing of physical layer mobile communication functions, including error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. As shown in FIG. 3, PHY subsystem 300 may include signal buffer 304, which may be a memory component configured to hold digital signal samples, e.g. as obtained via RF transceiver 204 (downlink) or protocol stack subsystem 310 (uplink). Search engine 306, measurement engine 308, and additional signal processing components of PHY subsystem 300 may be configured to access signal buffer 304 and process the baseband digital samples according to the corresponding signal processing functions of the respective components. Signal buffer 304 is represented as a single component in FIG. 3 for simplicity, and alternatively each component or given groups of components may have a dedicated buffer to hold digital signal samples for processing. Although not explicitly depicted in FIG. 3, the aforementioned functionality of PHY subsystem 300 may be realized as hardware and/or software (program code executed on a processor) components under the control of PHY controller 300. Skilled persons will appreciate the ability to implement the algorithmic, control, and I/O logic for such signal processing operations as either hardware or software logic with substantially equivalent functionality. PHY subsystem 300 may additionally include a non-transitory computer readable medium to store program code for retrieval by PHY controller 302, search engine circuit 306, measurement engine circuit 308, and other processors of PHY subsystem 300.

PHY controller 302 may be realized as a processor configured to execute physical layer control software and control the various components of PHY subsystem 300 under the direction of the control logic defined therein in order to provide the requisite physical layer functionality to mobile terminal 102. As further detailed below, PHY controller 302 may be configured to control search engine 306 and measurement engine 308 to perform cell search and measurement procedures.

Baseband modem 206 may additionally include protocol stack subsystem 310, which may be responsible for the Layer 2 and Layer 3 functionality of the protocol stack. In an LTE context, protocol stack subsystem 310 may be responsible for Medium Access Control (MAC), Radio Link Control (RLC), Packet Data Convergence Protocol (PDCP), Radio Resource Control (RRC), Non-Access Stratum (NAS), and Internet Protocol (IP) entity processes. Protocol stack subsystem 310 may be realized as a processor configured to execute protocol stack software and control mobile communication operations of mobile terminal 102 under the direction of control logic defined therein. Protocol stack subsystem 310 may interact with PHY subsystem 300, such as via an interface with PHY controller 302, to request physical layer services as specified by the protocol stack control logic including physical layer configuration and radio measurement. Protocol stack subsystem 310 may supply PHY subsystem 300 with downlink transport channel data (MAC data) scheduled for subsequent physical layer processing and transmission by PHY subsystem 300 (via RF transceiver 204 and antenna system 202). PHY subsystem 300 may conversely receive uplink physical channel data via (via RF transceiver 204 and antenna system 202) and perform subsequent physical layer processing on the received uplink physical channel data before providing the uplink physical channel data to protocol stack subsystem 300 as uplink transport channel data (MAC data). Subsequent reference to transmission and reception of signals by mobile terminal 102 may thus be understood as an interaction between antenna system 202, RF transceiver 204, and baseband modem 206 (PHY subsystem 300 and protocol stack subsystem 310) as thus detailed.

Baseband modem 206 may additionally interface with application processor 208, which may be implemented as a Central Processing Unit (CPU) and configured to execute various applications and/or programs of mobile terminal 102, such as e.g. applications corresponding to program code stored in a memory component of mobile terminal 102 (not explicitly shown in FIG. 2). Application processor 208 may be configured to run an operating system (OS) of mobile terminal 102, and may utilize the interface with baseband modem 206 in order to transmit and receive user data such as voice, video, application data, basic Internet/web access data, etc. Application processor 208 may also be configured to control one or more further components of mobile terminal 102, such as user input/output devices (display(s), keypad(s), touchscreen(s), speaker(s), external button(s), camera(s), microphone(s), etc.), peripheral devices, memory, power supply, external device interfaces, etc. Although depicted separately in FIG. 2, part or all of the detailed functionality of baseband modem 206 may be implemented at application processor 208, such as by executing the functionality of baseband modem 206 as software executed by the processor core of application processor 108 (e.g. in particular physical layer subsystem 300 and protocol stack subsystem 310). Such is recognized as providing equivalent functionality and the disclosure is thus not limited to either architecture.

Mobile terminal 102 may transmit and receive data with various network cells, such as e.g. cells 104a-104c, 106a-106c, and 108a-108c, according to the protocol stack and physical layer operations directed by physical layer subsystem 300 and protocol stack subsystem 310. As previously indicated, mobile terminal 102 may perform cell search in order to detent and potentially further interact with proximate network cells.

In the exemplary scenario of FIG. 1, each of cells 104a-104c, 106a-106c, and 108a-108c may be transmitting on a given first frequency layer, i.e. may be transmitting on the same carrier frequency. Base stations 104-108 may additionally each have one or more cells transmitting on one or more additional frequency layers (e.g. cells 104d-104f for base station 104, cells 106d-106f for base station 106, and cells 108d108f for base station 108 (not shown in FIG. 1) may transmit on a second frequency layer), and accordingly the following description focusing on a single frequency layer may analogously apply to one or more additional frequency layers. During a cell search procedure, mobile terminal 102 may aim to identify all detectable cells on one or more target frequency layers, which may include the aforementioned first frequency layer of cells 104a-104c, 106a-106c, and 108a-108c.

Mobile terminal 102 may thus trigger a cell search at a given point in time, which may be e.g. determined based on the mobility environment of mobile terminal 102 as observed by an RRC entity of protocol stack subsystem 310. For example, the RRC entity may determine based on a combination of network instruction and previous radio measurements that radio measurements should be performed as part of cell reselection or handover procedures. Alternatively, mobile terminal 102 may be implementing a power-up procedure (from a device power-off or a sleep state) or may be recovering from an Out Of Coverage (OOC) scenario, and consequently may need to perform network selection (e.g. PLMN selection) and/or cell selection.

The RRC entity may thus request a cell search from PHY controller 302, which may subsequently trigger a cell search at search engine circuit 306. Search engine circuit 306 may be implemented as a hardware and/or software system, and may be configured to receive and process digital signals provided to baseband modem 206 from RF transceiver 204 in order to perform cell search and detection. Physical layer subsystem 300 may receive and store digitized downlink signals (soft data) in buffer 304, which search engine circuit 306 may evaluate to detect cells. Search engine circuit 306 may subsequently report detected cells to PHY controller 302, which PHY controller 302 may proceed to trigger measurement for at measurement engine circuit 308 and/or report to the RRC entity of protocol stack subsystem 310. Search engine circuit 306 thus be configured to receive search probes of downlink signal data (stored in buffer 304) and process the received search probes to detect PSS and SSS sequences from proximate cells.

As will be detailed, search engine circuit 306 may be configured to obtain a list of candidate cells based on initial PSS and SSS detection, which may include identifying candidate cells based on PSS and SSS pairs that produce sufficient cross-correlation values with local copies of the predefined SSS and SSS sequences. Search engine circuit 306 may then evaluate the candidate cells of the candidate cell list to classify and discard any ghost cells in the candidate cell list. Such ghost cells may be categorized as either "sporadic" ghost cells or "deterministic" ghost cells. Sporadic ghost cells may be caused by random channel effects such as noise and interference and may vary between cell search iterations. For example, a sporadic ghost cell may be falsely detected when a random section of noise may mistakenly produce a match between a given PSS and SSS pair. Deterministic ghost cells may be caused by special properties of the SSS sequences employed in LTE networks and may each embody a fixed relationship between a real cell ID (given by the PSS and SSS indices) and the corresponding deterministic ghost cell ID. Each real cell may cause up to 21 deterministic ghost cells.

Search engine circuit 306 may evaluate a detected SSS symbol vector of each candidate cell in order to filter out both sporadic and deterministic ghost cells in the initial candidate cell list. As will be detailed, search engine circuit 306 may demodulate the detected SSS symbol vector and subsequently evaluate phase offsets between the elements of the demodulated SSS symbol vector. Search engine circuit 306 may then classify candidate cells as ghost cells if the elements of the corresponding demodulated SSS symbol vector exhibit considerably high phase offset variance and may classify candidate cells with low phase offset variance between the elements of the corresponding SSS symbol vector as real cells.

Figure 4:
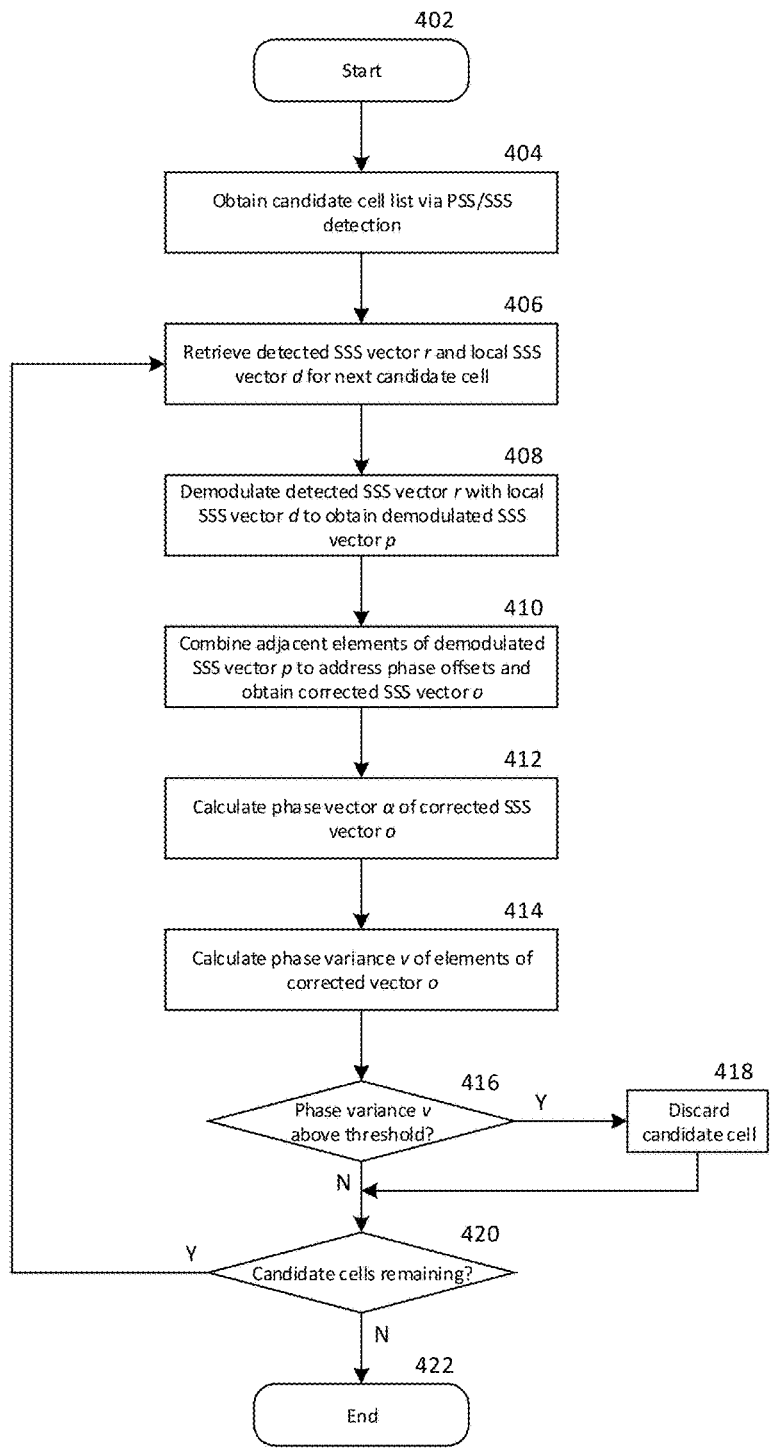
FIG. 4 shows a method of performing cell classification.

FIG. 4 shows method 400 which search engine circuit 306 may employ in order to filter out ghost cells utilizing the aforementioned phase offset variance characterization. The corresponding functionality of method 400 may be structurally embodied in search engine circuit 306 as hardware logic, e.g. as an integrated circuit or FPGA, or as software logic, e.g. as program code defining arithmetic, control, and I/O instructions stored in a non-transitory computer-readable storage medium and executed on a processor.

Search engine circuit 306 may first obtain an initial candidate cell list via PSS and SSS detection in 404. Search engine circuit 306 may thus capture a 5 ms search probe of downlink signal data and process the search probe in order to identify contributions from any proximate cells (such as e.g. any one or more of cells 104a-104c, 106a-106c, and 108a-108c) that are detectable in the form of PSS and SSS sequences contained in the search probe. For example, search engine circuit 306 may obtain the search probe of downlink signal data following radio frequency demodulation and digitization (e.g. at RF transceiver 204) and store the digital samples of the search probe in signal buffer 304.

Figure 5:
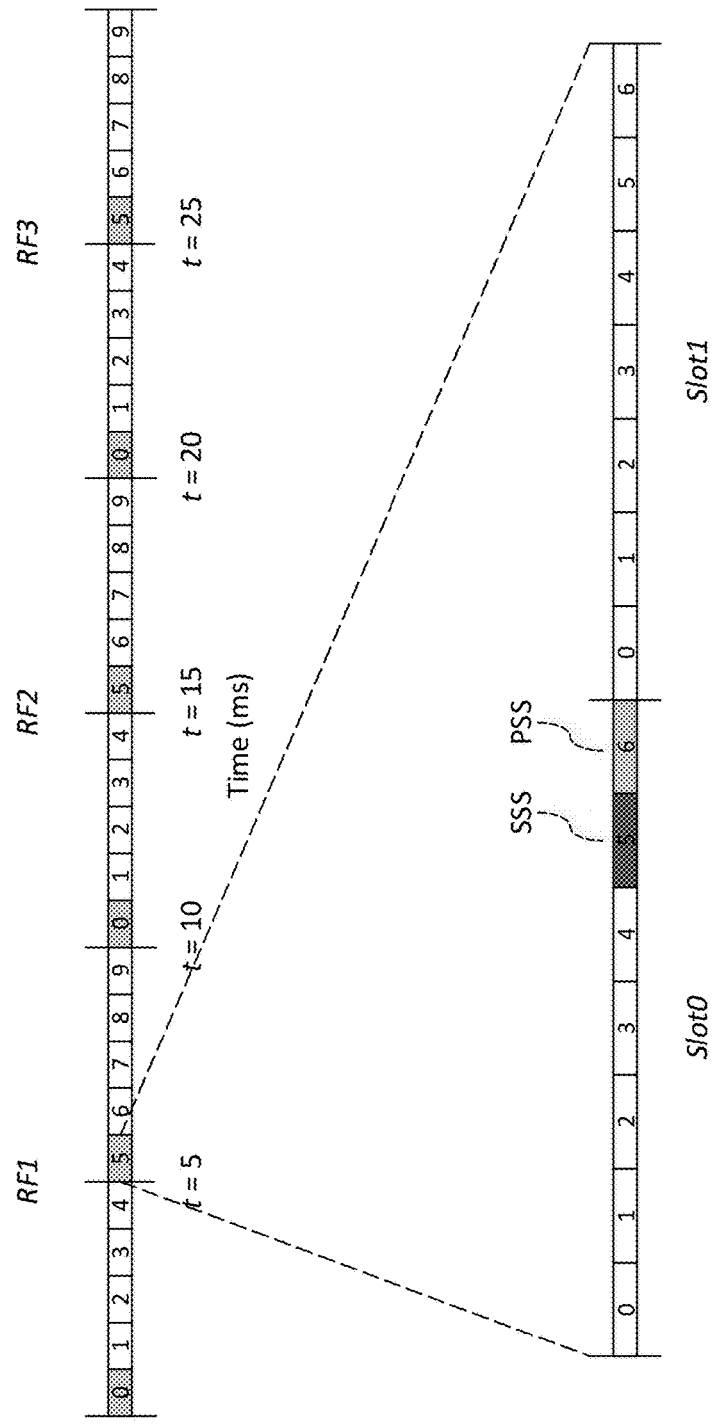
FIG. 5 shows a timing diagram illustrating a first synchronization sequence schedule.
Figure 6:
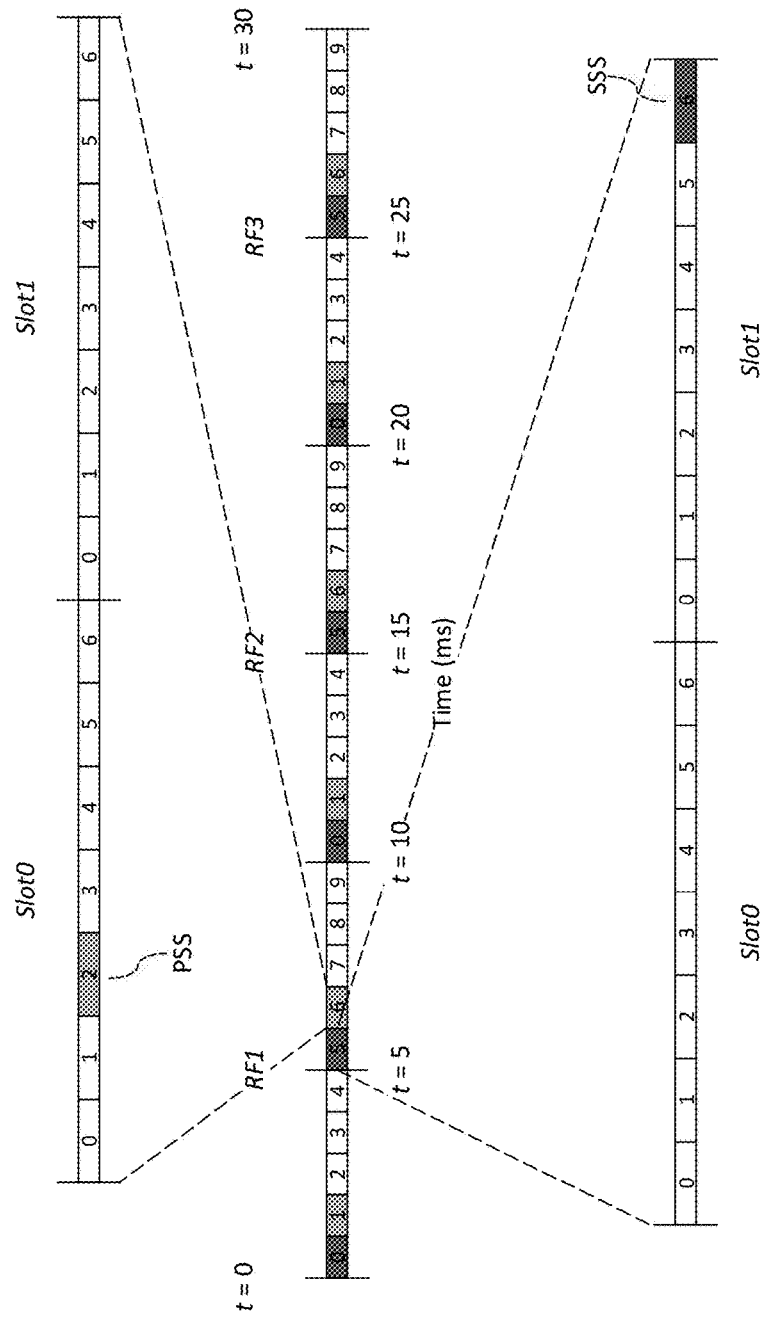
FIG. 6 shows a timing diagram illustrating a second synchronization sequence schedule.

Search engine circuit 306 may proceed to process the digital samples of the search probe stored in buffer 304 to identify the presence of any PSS and SSS sequences. As specified by the 3GPP for LTE networks, LTE cells may transmit a PSS and an SSS sequence every 5 ms according to a fixed pattern, where the fixed pattern may differ between Frequency Division Duplexing (FDD) mode and Time Division Duplexing (TDD) mode. FIG. 5 shows a graphical depiction of the downlink transmission pattern of PSS and SSS sequences in FDD mode. As shown in FIG. 5, LTE cells may transmit downlink signals over a series of 10 ms radio frames, which radio frame is divided into 10 subframes each of 1 ms duration. Each subframe is divided two slots which each contain either 6 or 7 symbol periods depending on the Cyclic Prefix (CP) length. LTE cells may transmit a PSS sequence in the last symbol period of the first slot ($6^{th}$ or $7^{th}$ symbol period of the first slot depending on CP length) and an SSS sequence in symbol period before the PSS, and may repeat this fixed symbol pattern over all radio frames. FIG. 6 shows a graphical depiction of the downlink transmission pattern of PSS and SSS sequences in TDD mode. As shown in FIG. 6, LTE cells may transmit a PSS sequence in the $3^{rd}$ symbol period of the first slot of the $1^{st}$ and $6^{th}$ subframes of each radio frame. LTE cells may then transmit an SSS sequence in the last symbol period of the second slot of the $0^{th}$ and $5^{th}$ subframes ($6^{th}$ or $7^{th}$ symbol period of the second slot depending on CP length). The separation in time between transmitted PSS and SSS sequences may thus vary as a function of both duplexing mode and CP length, which as further detailed below search engine circuit 306 may utilize to determine the duplexing mode and CP length of cells detected during cell search.

In accordance with the Orthogonal Frequency Division Multiplexing (OFDM) scheme employed for downlink in LTE, each LTE cell may transmit downlink signals over a set of subcarriers, where each set of 12 contiguous subcarriers (spaced every 15 kHz) are grouped into a resource block. An LTE cell may transmit downlink signals over between 6 and 20 resource blocks (dependent on the particular system bandwidth), where each discrete subcarrier of the utilized resource blocks may transmit a single symbol (per symbol period).

As defined in Section 6.11 of 3GPP Technical Specification 36.211, "Physical channels and modulation", V12.5.0 ("3GPP TS 36.211"), each cell transmits a PSS and SSS sequence pair that identifies the Physical Cell Identity (PCI) of the cell where the PSS sequence gives the physical-layer identity (ranging from 0 to 2) and the SSS sequence gives the physical-layer cell identity group (ranging from 0 to 167). Search engine circuit 306 may identify the PCI (ranging from 0 to 503) of a given cell by identifying the PSS and SSS sequence transmitted by the cell. Specifically, the PSS sequence index (out of the possible set of 3 predefined PSS sequences) may denote the physical-layer identity $N_{ID}^{(2)}$ while the SSS sequence index (out of the possible set of 168 predefined SSS sequences) may denote the physical-layer cell-identity group $N_{ID}^{(1)}$. The PCI $N_{ID}^{cell}$ may then be given as $N_{ID}^{cell}=3N_{ID}^{(1)}+N_{ID}^{(2)}$, thus allowing search engine circuit 306 to obtain the PCI of a cell by identifying the specific PSS and SSS sequence pair transmitted by the cell.

As further specified in Section 6.11 of 3GPP TS 36.211, each PSS sequence may be a 62-length sequence generated from a frequency-domain Zadoff-Chu root sequence that is mapped to one of the 62 central subcarriers (excluding a central DC subcarrier) of the system bandwidth during the aforementioned PSS symbol period. Each SSS sequence may be a 62-length sequence generated from a frequency-domain pseudorandom noise sequence that is similarly mapped to the 62 central subcarriers during the aforementioned SSS symbol period. Each of the 3 possible PSS sequences and 168 possible SSS sequences are predefined, and accordingly known at search engine circuit 306.

Accordingly, at 404 search engine circuit 306 may compare locally-generated or locally-stored copies of the possible PSS and SSS sequences to the new search probe in order to determine whether the new search probe contains PSS and SSS sequences transmitted by detectable cells and, if so, determine the timing location of the PSS and SSS sequences in the new search probe. By identifying the presence and timing location of PSS and SSS sequences, search engine circuit 306 may determine the PCI of each detectable cell as well as obtain a timing reference to obtain synchronization with each detectable cell (i.e. by virtue of the fixed location in time of PSS and SSS sequences in the downlink transmission schedule of a cell).

Specifically, search engine circuit 306 may calculate the cross-correlation function between each locally generated PSS sequence and the digital samples of the search probe in the time domain. Search engine circuit 306 may then identify the presence of transmitted PSS sequences in the search probe by analyzing the peaks in the resulting cross-correlation functions, where a peak of sufficient amplitude may indicate the presence of a PSS sequence matching the corresponding locally-generated PSS sequence utilized to calculate the cross-correlation function. Search engine circuit 306 may thus identify the peak at a particular sample of the search probe and thus obtain a time point within the search probe that marks the location of a PSS sequence of potential cell.

Search engine circuit 306 may thus identify one or more timing locations within the search probe that mark the potential location of PSS sequences. Search engine circuit 306 may then utilize locally-generated copies of each SSS sequence to calculate the cross-correlation function between each local SSS sequence and the search probe to identify the presence of SSS sequences. As previously detailed regarding FIGS. 5 and 6, the position in time of an SSS sequence to a PSS sequences may vary as a function of duplexing mode and CP length, and accordingly an SSS sequence may appear at a finite number of timing positions relative to a detected PSSS sequence. Furthermore, search engine circuit 306 may utilize the timing position of a detected PSS to obtain symbol period synchronization, and may thus utilize the detected PSS sequence timing positions to place an FFT window and subsequently transform the time-domain search probe into frequency-domain SSS symbols. Search engine circuit 306 may additionally apply the PSS sequences (which occur prior to each SSS sequence as shown in FIGS. 5 and 6) to equalize for channel effects for SSS detection. Search engine circuit 306 may then calculate the cross-correlation functions for the SSS sequences in the frequency domain (e.g. using an element-wise "fast" correlation calculation). Search engine circuit 306 may then similarly evaluate the resulting SSS cross-correlation functions to identify whether an SSS sequence is present based on the cross-correlation peaks. Depending on the location of a detected SSS sequence relative to a previously detected PSS sequence, search engine circuit 306 may determine the duplexing mode and CP length of a potential cell present in the new search probe. Such procedures for PSS and SSS detection with cross-correlation are well-established and will be recognized by skilled persons.

Search engine circuit 306 may thus identify a candidate cell for each PSS-SSS pair that produces a sufficient match at a specific time position of the search probe according to the calculated cross-correlation functions, and accordingly may obtain a candidate cell list containing all such matches in 404. Search engine circuit 306 may additionally employ multiple captured search probes in order to accumulate or average (non-coherent for PSS accumulation and coherent or non-coherent for SSS accumulation) PSS and SSS detection results over multiple half-frames in order to alleviate noise and interference.

Search engine circuit 306 may then evaluate each candidate cell of the candidate cell list in 406-420 in order to classify each candidate cell as a real cell or ghost cell. As previously indicated, search engine circuit 306 may identify each candidate cell in 404 by detecting a PSS-SSS pair that matches with the received search probe, e.g. according to cross-correlation functions. Each PSS-SSS pair may thus correspond to one of the predefined PSS sequences and one of the predefined SSS sequences. In the context of method 400, search engine circuit 306 may evaluate the candidate cells by comparing the captured search probe to the identified predefined SSS sequence in order to classify each candidate cell as a real cell or ghost cell.

As specified in Section 6.11.2 of 3GPP TS 36.211, each SSS sequence $d(n)$ transmitted by a cell is an "interleaved concatenation of two length-31 binary sequences", denoted as $d(2n)$ for the even-indexed sequence and $d(2n+1)$ for the odd-indexed sequence to produce concatenated sequence $d(n)$ defined for $0 \leq n \leq 61$. The interleaving sequences $d(2n)$ and $d(2n)$ are generated by applying scrambling sequences $c_0(n)$, $c_1(n)$, $z_1^{(m_0)}(n)$, and $z_1^{(m_1)}(n)$ to shifted base sequences $s_0^{(m_0)}(n)$ and $s_1^{(m_1)}(n)$ as follows:

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad (1)$$

$$d(2n+1) = \begin{cases} s_1^{(m_1)}(n)c_1(n)z_1^{(m_0)}(n) & \text{in subframe 0} \\ s_0^{(m_1)}(n)c_1(n)z_1^{(m_1)}(n) & \text{in subframe 5} \end{cases}$$

where $0 \leq n \leq 30$. As defined in Section 6.11.2.1 of 3GPP TS 36.211, scrambling sequences $c_0(n)$ and $c_1(n)$ are sequences of $\pm 1$ dependent on PSS sequence index $N_{ID}^{(2)}$ and scrambling sequences $z_1^{(m_0)}(n)$ and $z_1^{(m_1)}(n)$ are similarly sequences of $\pm 1$ dependent on SSS sequence index $N_{ID}^{(2)}$ (by way of cyclic shifts $m_0$ and $m_1$ as detailed regarding FIG. 7).

The shifted base sequences $s_0^{(m_0)}(n)$ and $s_1^{(m_1)}(n)$ used to generate $d(n)$ are defined as two different cyclic shifts of base sequence $\tilde{s}(n)$ according to $$s_0^{(m_0)}(n) = \tilde{s}((n+m_0) \bmod 31)$$

$$s_1^{(m_1)}(n) = \tilde{s}((n+m_1) \bmod 31) \quad (2)$$

where $\tilde{s}(i) = 1 - 2x(i)$, $0 \leq i \leq 30$, is defined by $$x(\bar{i}+5) = (x(\bar{i}+2)+x(\bar{i})) \bmod 2, \ 0 \leq \bar{i} \leq 25 \quad (3)$$

with initial conditions $x(0)=0$, $x(1)=0$, $x(2)=0$, $x(3)=0$, and $x(4)=1$.

The cyclic shifts $m_0$ and $m_1$ applied to $\tilde{s}(n)$ are defined according to the SSS sequence index $N_{ID}^{(1)}$ (physical-layer cell-identity group), which as previously detailed specifies the PCI $N_{ID}^{cell}$ along with the PSS sequence index $N_{ID}^{(2)}$ (physical-layer identity within the physical-layer cell identity group). FIG. 7 shows Table 6.11.2.1-1 from Section 6.11.2.1 of 3GPP TS 36.211 that defines the cyclic shifts $m_0$ and $m_1$ for each SSS sequence index $N_{ID}^{(1)}$ (physical-layer cell-identity group).

Accordingly, each cell may generate and transmit an SSS sequence $d(n)$ during a single symbol period per half-frame (where $d(n)$ may alternate between two different SSS sequences each half-frame according to Equation (1) that both correspond to the SSS sequence index $N_{ID}^{(1)}$ (physical-layer cell-identity group) of the cell), where the 62 symbols of SSS sequence $d(n)$ may be mapped to the central 62 subcarriers (excluding the DC subcarrier) of the system bandwidth as specified in Section 6.11.2.2 of 3GPP TS 36.211. As previously indicated, search engine circuit 306 may employ the prior placement in time of the PSS sequence (as shown in FIGS. 5 and 6) to perform channel equalization and obtain symbol-timing boundaries, thus allowing search engine circuit 306 to convert each identified SSS symbol period of the captured half-frame to the frequency domain and thus obtain detected length-62 SSS symbol vector r. Search engine circuit 306 may identify candidate cells by comparing each detected SSS symbol vector r to the possible set of 168 SSS sequences to identify a local predefined SSS symbol vector d (if any) that sufficiently matches detected SSS symbol vector r, e.g. on the basis of a cross-correlation peak of sufficient amplitude.

Search engine circuit 306 may thus obtain a detected SSS symbol vector r (matching an SSS symbol vector d of one of the 168 possible predefined SSS sequences) for each candidate cell identified in 404 (in addition to a matching PSS sequence index and related processing data, cell timing information, duplexing information, cyclic prefix information, etc.). In the context of method 400, search engine circuit 306 may evaluate the detected SSS symbol vector r in 406-418 for each candidate cell in order to classify each candidate cell as either a real cell or ghost cell. As will be detailed, the detected SSS symbol vector r of real cells may be distinguishable from detected SSS symbol vectors r of both deterministic and sporadic ghost cells, thus allowing search engine circuit 306 to apply method 400 to effectively identify and discard both deterministic and sporadic ghost cells.

As shown in FIG. 4, search engine circuit 306 may iterate through the candidate cell list obtained via PSS and SSS detection in 404 to evaluate each candidate cell. Search engine circuit 306 may retrieve the detected SSS vector r and the corresponding local SSS vector d (that triggered a match with r during SSS detection in 404) in 406. Search engine circuit 306 may then demodulate detected SSS vector r with local SSS vector d to obtain demodulated SSS vector p. As equivalently defined above in Equations (1)-(3), local SSS vector d may be a length-62 vector $d=(d_1, \ldots, d_{N-1})$ with $N=62$ where $s_i \in \{-1, +1\}$ for $0 \leq i \leq N-1$. In other words, local SSS vector d may be a pseudorandom sequence of −1 and +1 symbols, where d is generated from shifted base sequences $s_0^{(m_0)}(n)$ and $s_1^{(m_1)}(n)$ according to Equation (1). Search engine circuit 306 may receive the originally transmitted d in the form of detected SSS symbol vector $r=(r_0, r_1, \ldots, r_{N-1})$ with $N=62$ where $r_i \in \mathbb{C}$ for $0 \leq i \leq N-1$.

Figure 8:
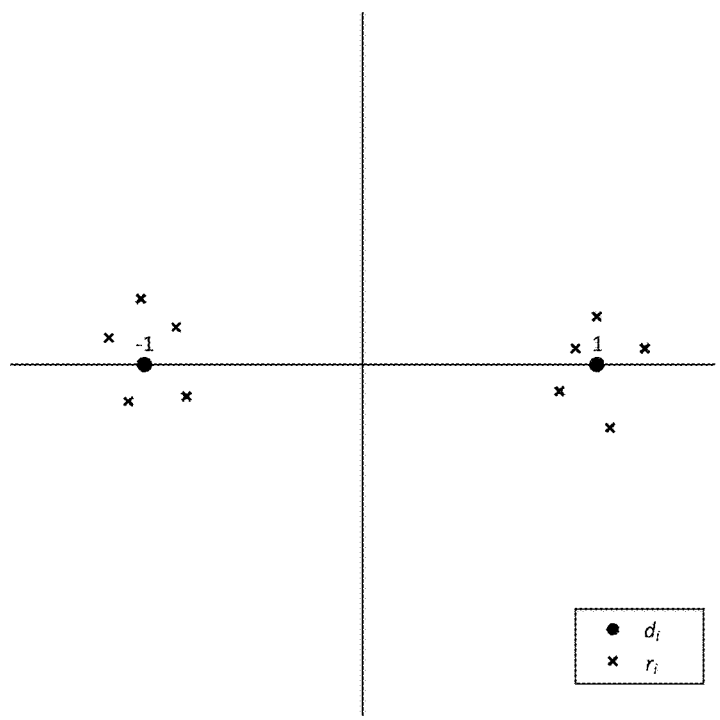
FIG. 8 shows an example of noisy synchronization sequence demodulation on a complex plane.

While the corresponding cell may transmit d with $d_i \in \{-1, +1\}$, i.e. symbols of either −1 or +1, search engine circuit 306 may receive d in the form of detected symbol vector r with $r_i \in \mathbb{C}$, i.e. complex-valued symbols. In other words, wireless transmission and local processing at mobile terminal 102 may distort the original −1 and +1 symbols of d to other symbols in the complex plane, thus yielding detected SSS symbol vector r. FIG. 8 shows a basic example in which originally transmitted SSS symbols $d_i \in \{-1, +1\}$ are translated from the real-valued (−1,0) and (+1,0) positions on the real axis to complex-valued symbols $r_i \in \mathbb{C}$. As shown in FIG. 8, the originally transmitted/local predefined SSS symbols of d may thus be exclusively limited to real symbols with phase of 0 or π (180) while the detected symbols of r may contain both real and imaginary components and exhibit any phase (depending on the aforementioned noise and other imperfections).

Search engine circuit 306 may perform the demodulation operation of 408 by performing the element-wise multiplication of d and r as $$p_i=d_i r_i, \; 0 \leq i \leq N-1 \quad (4)$$

thus producing demodulated SSS vector p.

Demodulated SSS vector p may provide an indication of the accuracy of detected SSS symbol vector r. In the case of an ideal channel where d and r match, i.e. $r_i=d_i \in \{-1, +1\}$ for $0 \leq i \leq N-1$, demodulated vector p will produce $p_i=1$ for all $0 \leq i \leq N-1$ as each product $d_i r_i$ will be the result of either −1·−1 or 1·1.

In the absence of carrier frequency offsets and symbol period misalignment (as further detailed below), demodulated SSS vector p in an imperfect case (as exemplified in FIG. 8 with $r_i \in \mathbb{C}$) may be expected to produce elements $p_i$ that are all relatively close to +1 on the complex plane (assuming manageable noise) if d is an appropriate match for r. However, if d is not an appropriate match for r, e.g. if the current candidate cell is a deterministic or sporadic ghost cell, the elements of $p_i$ are not expected to all be grouped close to +1 and may instead constitute separate groups of points grouped next to both −1 and +1.

However, there may exist both constant and linearly increasing phase offsets in the elements of detected SSS symbol vector r due to the aforementioned effects of carrier frequency offsets and symbol period misalignment. As previously indicated, the 62 SSS symbols may be mapped to the central 62 subcarriers of the system bandwidth, and accordingly may be separated by a fixed subcarrier spacing of e.g. 15 kHz. In the event of a carrier frequency offset between the RF unit of the transmitting cell and the demodulation frequency utilized by RF transceiver 204, each element of detected SSS symbol vector r may have a constant phase offset, i.e. may each be offset from the corresponding point −1 or +1 by the same phase offset (in addition to individual phase offsets caused by noise and symbol period misalignment), which may be similarly reflected in demodulated SSS symbol vector p.

Search engine circuit 306 may thus combine adjacent elements of demodulated SSS symbol vector p in order to eliminate such constant phase offsets in 410 by calculating corrected SSS symbol vector o as $$o_i=p_i p^*_{i+1}, \; 0 \leq i \leq N-2 \quad (5)$$

where (·)* denotes the complex conjugate operator, thus producing $o=(o_0, o_1, \ldots, o_{N-2})$.

By multiplying each element $p_i$ by the complex conjugate of the neighboring element $p_{i+1}$, search engine circuit 306 may counter a constant phase offset present between adjacent elements (separated by the 15 kHz subcarrier spacing) and as a result produce o with elements $o_i$ that do not contain this constant offset between elements. Such may additionally amount to eliminating "slow noise", which may allow search engine circuit 306 to remove similar channel effects between adjacent elements by multiplying each element of p with the incrementally neighboring element.

The combining operation of 410 may also produce the added effect of eliminating linearly-increasing phase offsets between adjacent elements of p due to symbol period misalignment. As previously detailed, search engine circuit 306 may convert an identified SSS symbol period to the frequency domain using an identified PSS timing position to place an FFT window for conversion to the frequency domain. However, the FFT window placement may not align perfectly with the actual position of the SSS sequence in time, which may produce a linearly increasing phase if the symbol period placement is outside of the cyclic prefix of the SSS sequence, i.e. an FFT window placement timing error greater than the cyclic prefix duration.

In the event that such an error in FFT window placement exists, the elements of p will yield a linearly increasing phase offset between neighboring elements. By multiplying each element $p_i$ with the complex conjugate $p^*_{i+1}$ of the adjacent element, search engine circuit 306 may translate such linearly increasing phases into a constant phase offset that is common between all elements $o_i$. In certain rare conditions with minimal carrier frequency and timing mismatches, search engine circuit 306 may be able to omit the phase-alignment operation as the effects of carrier frequency and timing mismatch may be insufficient to substantially affect detection.

Search engine circuit 306 may then calculate the phase $\alpha_i$ of each element of $o_i$ in 412 as $$\alpha_i = \arctan(o_i) \quad 0 \le i \le N-2 \quad (6)$$

to obtain phase vector $\alpha = (\alpha_0, \alpha_1, \ldots, \alpha_{N-2})$.

Search engine circuit 306 may thus obtain the pure phase information of each element $o_i$ of corrected SSS vector o, which may allow search engine circuit 306 to ignore the effects of varying signal strength in detected SSS vector r. Search engine circuit 306 may thus ignore the effects of frequency selective fading and similar channel effects that may affect the amplitudes of r, which may negatively impact classification performance and otherwise prevent search engine circuit 306 from combining information from different detected SSS symbol vectors r without needing to account for differing signal levels.

After obtaining the pure phase information of o in 412, search engine circuit 306 may calculate a scalar "variance" v over the obtained angles $\alpha_i$ in 414 as $$v = \frac{1}{N-1} \sum_{i=0}^{N-2} (\alpha_i - \mu)^2 \quad (7)$$

where $$\mu = \frac{1}{N-1} \sum_{i=0}^{N-2} \alpha_i \quad (8)$$

By evaluating the phase variance v, search engine circuit 306 may eliminate constant phase offsets between the elements of o (that arise from e.g. FFT window misalignment) as each angle $\alpha_i$ will be offset by a constant value, thus producing a low variance.

In the final classification step of method 400, search engine circuit 306 may compare the phase variance v of the current candidate cell to a phase variance threshold. If v is above the phase variance threshold, search engine circuit 306 may classify the current candidate cell as a ghost cell and discard the current candidate cell in 418 from the candidate cell list. If v does not exceed the phase variance threshold, search engine circuit 306 may keep the current candidate cell in the candidate cell list, thus classifying the candidate cell as a real cell.

Both deterministic and sporadic ghost cells may produce high values for phase variance v while real cells may produce considerably lower values for phase variance v, thus allowing search engine circuit 306 to effectively distinguish real cells from ghost cells by virtue of the phase variance evaluation in 416. As previously detailed, local SSS vector d may be expressed as the interleaved concatenation d(n) of interleaving sequences d(2n) and d(2n+1) as defined in Equation (1) to generate, where one of the interleaving sequences is generated from shifted base sequence $s_0^{(m_0)}$ and the other is generated from shifted base sequence $s_1^{(m_1)}$. Detected SSS vector r may similarly be expressed as the interleaved concatenation r(n) of corresponding interleaving sequences r(2n) and r(2n+1), i.e. the even- and odd-indexed elements of detected SSS vector r, respectively.

In the case of sporadic ghost cells, which as previously detailed may be triggered by noise mistakenly identified as a PSS-SSS pair in 404, neither of the interleaving sequences r(2n) and r(2n+1) will be correlated with the local SSS sequence d(n), and accordingly will not produce phase elements $\alpha_i$ with a high variance, i.e. phase elements $\alpha_i$ will not have similar values. As can be seen from Equation (4), the demodulation of non-matching r and s will not produce $p_i=1$ for $0 \le i \le N-1$. Accordingly, there will exist a large phase variance v thus allowing search engine circuit 306 to identify and discard sporadic ghost cells in 416 and 418.

As previously indicated, deterministic ghost cells may be caused by special properties of SSS sequences. Specifically, deterministic ghost cells may be caused when one SSS interleaving sequence of an identified PSS-SSS candidate cell pair is correct and the other SSS interleaving sequence is incorrect. In other words, the SSS sequence r(n) of the identified PSS-SSS pair may contain the correct shifted base sequence $s_0^{(m_0)}$ or $s_1^{(m_1)}$ for either r(2n) and r(2n+1) (see Equation (1)) and incorrect for the other. Such may result from PSS-SSS detection when a local SSS sequence generated from one incorrect SSS interleaving sequence and one correct SSS interleaving sequence produces a sufficient cross-correlation for initial inclusion in the candidate cell list.

As having only one correct SSS interleaving sequence may be sufficient to cause a deterministic ghost cell, each real cell can cause up to 21 ghost cells. As seen in FIG. 7, certain cyclic shifts $m_0$ and $m_1$ are re-used for multiple physical-layer cell identity groups $N_{ID}^{(1)}$. For example, cyclic shift $m_0=0$ is re-used for 7 different physical-layer cell identity groups $N_{ID}^{(1)}$. Given the additional 3 possibilities for physical-layer identity $N_{ID}^{(1)}$ to define the PCI $N_{ID}^{cell}$, such real cells may be capable of being mistaken for up to 21 different deterministic ghost cells, where each deterministic ghost cell corresponds to a PSS-SSS pair for which at least one of the SSS interleaving sequences is correct.

As only one of the SSS interleaving sequences is correct for deterministic ghost cells, i.e. either the even- or odd-indexed elements of r is derived from the correct shifted base sequence, the demodulated SSS sequence p and the resulting phases elements $\alpha_i$ will not have similar values. Specifically, the elements of corrected SSS symbol vector o may be more random as one of the interleaved sequences (even- or odd-indexed elements of r) is correct while the other is random, thus producing an o with a high degree of randomness. Accordingly, the phases $\alpha$ of o will not point in the same direction, thus consequently causing a high phase variance metric v for deterministic ghost cells. For example, given even-indexed elements $p_{even} = p_{2i}$ and odd-indexed elements $p_{odd} = p_{2i+1}$ for $i=0, 1, \ldots, N/2-1$ of a given demodulated SSS vector p where $p_{even}$ correlates to s and $p_{odd}$ is random (rendering the current candidate cell a deterministic ghost cell), the elements of $p_{even}$ would in an ideal case (assuming no noise) all be equal to 1 while the elements of $p_{odd}$ would be largely random. Accordingly, the element-wise product $o_i = p_i p^*_{i+1}$, $0 \le i \le N-2$ would produce elements of o that point in random directions, thus yielding a high phase variance v between the elements of o. Search engine circuit 306 may rely on such in order to differentiate deterministic ghost cells from real cells.

Search engine circuit 306 may thus identify and discard both deterministic and sporadic ghost cells by virtue of the phase variance evaluation in 416 and 418. An exemplary phase variance threshold for distinguishing between real cells and ghost cells may be e.g. 15 degrees, 30 degrees, etc., and may be readily configurable to a number of different values in order to adjust the filtering sensitivity where lower values for the phase variance threshold will produce strict filtering and higher values for the phase variance threshold will produce weak filtering.

After classifying the current candidate cell, search engine circuit 306 may proceed to 420 to iteratively repeat 406-420 on the next candidate cell (if any) of the candidate cell list. Search engine circuit 306 may thus evaluate each candidate cell of the candidate cell list in order to classify each candidate cell as either a real cell (maintained in the candidate cell list) or a ghost cell (discarded from the candidate cell list). Search engine circuit 306 may perform 406-420 in sequence, i.e. for one candidate cell at a time, or in parallel, e.g. more than one candidate cell at a time.

Upon evaluating all candidate cells of the candidate cell list at 422, search engine circuit 306 may obtain a final candidate cell list that contains only the candidate cells that are suitable for classification as real cell based on the phase variance metric v. Search engine circuit 306 may report the final candidate cell list to PHY controller 302, which may provide the final candidate cell list to measurement engine circuit 308 for further measurement. PHY controller 302 may then report the resulting measurements to the RRC entity of protocol stack subsystem 310, which may perform mobility operations such as handover, cell selection or reselection, PLMN selection, measurement reporting to the network, etc., based on the measurements reported to the RRC entity. By accurately identifying and eliminating ghost cells from the candidate cell list, search engine circuit 306 may reduce the computational burden on measurement engine circuit 308 which may additionally conserve power.

Search engine circuit 306 may additionally perform further evaluation on the final candidate cell list produced by method 400, such as to perform further ghost cell filtering on the final candidate cell list in order to further refine the candidate cell list. Alternatively, search engine circuit 306 may employ additional filtering techniques between 404 and 406 in order to refine the initial candidate cell list obtained via PSS/SSS detection and subsequently apply 406-420 on the refined candidate cell list. Such may be examples of "sequential classification" in which multiple discrete classification stages are applied in sequence to repeatedly filter an initial candidate cell list. Each classification stage may thus output a further refined candidate cell list and collectively produce a final candidate cell list at the output of the final classification stage.

Figure 9:
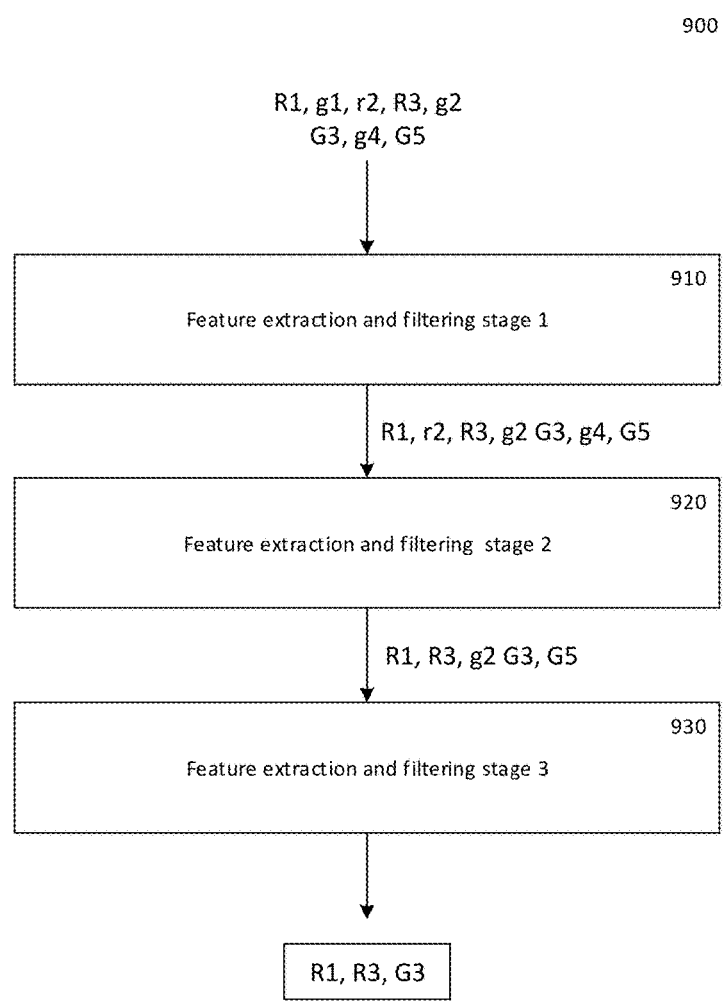
FIG. 9 shows a block diagram illustrating sequential cell classification.

FIG. 9 shows a basic example of such sequential classification, which may include three separate classification stage circuits 910, 920, and 930. Each of classification stage circuits 910-930 may be implemented as separate or unified hardware and/or software in search engine circuit 306 or PHY controller 302, and may each perform separate feature extraction and filtering in order to identify and discard ghost cells from an initial candidate cell list. Search engine circuit 306 or PHY controller 302 may obtain the initial candidate cell list via PSS/SSS detection as in 404 of method 400 and subsequently provide the initial candidate cell list to sequential classification system 900 depicted in FIG. 9.

As shown in FIG. 9, the initial candidate cell list may contain two "strong real cells" (R1 and R3; i.e. easy to classify as a real cell), one "weak real cell" (r2; i.e. difficult to classify as a real cell), three "weak ghost cells" (g1, g2, and g4; i.e. easy to classify as a ghost cell), and two "strong ghost cells" (G3, G5; i.e. hard to classify as a ghost cell). Each classification stage circuit 910-930 may receive a candidate cell list and perform feature extraction and filtering in order to identify ghost cells based on specific criteria and discard the identified ghost cells from a refined candidate cell list produced as the output of the classification stage.

Each classification stage circuit 910-930 may apply a feature extraction technique such as the phase variance evaluation detailed above, frequency offset-based hard filtering, raw vs. filtered synchronization signal energy comparison, SNR averaging-based filtering, and other such ghost cell filtering techniques. In frequency offset-based hard filtering, the classification stage circuit may obtain a carrier frequency offset estimate for a cell and compare the carrier frequency offset estimate to a worst-case Doppler shift and oscillator mismatch to determine whether the carrier frequency offset estimate falls within the worst-case range of possible carrier frequency offsets. If the carrier frequency offset estimate falls outside the worst-case range of possible carrier frequency offsets, the classification stage circuit may classify the cell as a ghost cell, and may conversely classify the cell as a real cell if the carrier frequency offset estimate falls within the worst-case range of possible carrier frequency offsets. The classification stage circuit may obtain the carrier frequency offset estimate for each cell from a coarse frequency estimator (i.e. a carrier frequency offset estimate based on the phase difference of correlating received PSS sequences in the time domain) and a fine frequency estimator (e.g. a carrier frequency offset estimate based on the residual phase after channel correcting received SSS sequences using PSS sequences as pilots), where the coarse carrier frequency offset estimate and the fine carrier frequency offset estimate give the carrier frequency offset estimate at baseband for each cell.

In raw vs. filtered synchronization signal energy comparison, the classification stage circuit may evaluate the compare the energy before and after matched filtering of PSS sequences during PSS detection. For example, search engine circuit 306 may utilize a matched filter at each timing position of a captured search probe that may hold a cell and subsequently apply the matched filter (e.g. as a cross-correlation calculation) and evaluate the resulting output to determine whether a PSS sequence is present. The classification stage circuit may evaluate the signal energy before and after matched filter application and subsequently distinguish between real and ghost cells based on the ratio of the before and after signal energies.

The classification stage circuit may obtain a channel cross-energy vector, i.e. a coarse cross-energy vector, for each PSS candidate (each PSS peak). The classification stage circuit may then filter the PSS candidates using the channel cross-energy vector and obtain a filtered cross-energy vector. The classification stage circuit may then scale the coarse cross-energy vector by a threshold vector to obtain a detection cross-energy vector and compare the filtered cross-energy vector the detection cross-energy vector. If the filtered cross-energy vector is below the detection cross-energy vector, the classification stage circuit may classify the PSS candidate as a ghost cell (thus removing the PSS candidate from consideration) and may conversely classify the PSS candidate as a real cell if the filtered cross-energy vector is above the detection cross-energy vector. As such raw vs. filtered synchronization signal energy comparisons evaluate PSS candidates, such may be performed prior to SSS evaluation.

In SNR averaging, the classification stage circuit may evaluate the SNR of each candidate cell (which may be calculated at measurement engine circuit 308 and subsequently provided to the classification stage circuit) and classify each candidate cell as a real cell or a ghost cell based on the SNR, such as by classifying high SNR candidate cells as real cells and low SNR candidate cells as ghost cells. The classification stage circuit may average multiple SNR measurements and subsequently compare the averaged SNR metric to an SNR threshold for such classification.

Accordingly, each classification stage circuit 910-930 may utilize different feature extraction and filtering technique to identify and remove ghost cells from the candidate cell list. FIG. 9 depicts an exemplary sequence of such removals, where classification stage circuit 910 removes weak ghost cell g1, classification stage circuit 920 removes weak ghost cell g4 and weak real cell r2, and classification stage circuit 930 removes weak ghost cell g2 and strong ghost cell G5. In this exemplary scenario, the sequential classification system may mistakenly classify strong ghost cell G3 as a real cell and mistakenly discard weak real cell r2 as a ghost cell. Such may be a result of the sequential operation of classification stage circuits 910-930, as each feature extraction and filtering stage is expected to perform hard filtering, i.e. by exclusively classifying each candidate cell as either a ghost cell or real cell and thus not providing any soft or intermediate data.

Figure 10:
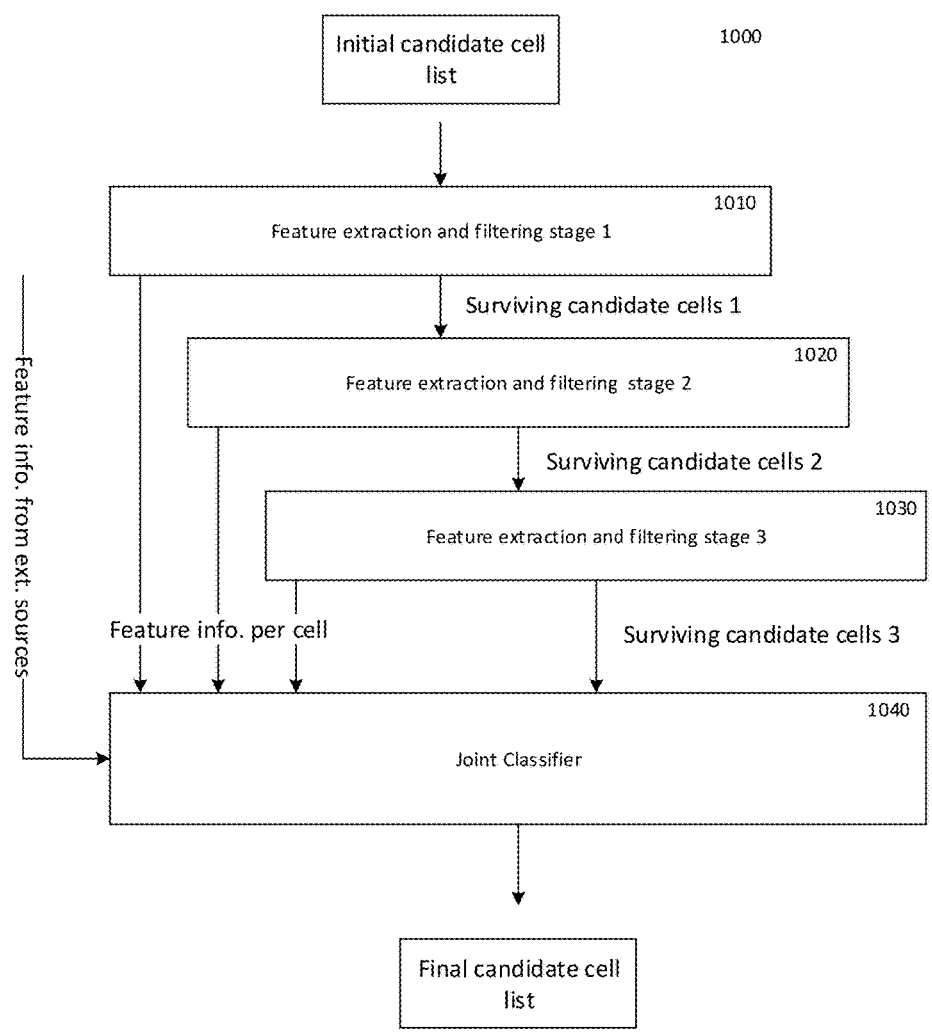
FIG. 10 shows a block diagram illustrating hybrid sequential and joint cell classification.

As opposed to performing sequential hard filtering, PHY controller 302 may instead perform "joint" classification by evaluating soft results from multiple feature extraction and filtering stages in parallel. FIG. 10 shows an exemplary architecture in which each of classification stage circuits 1010-1030 perform filtering on a received candidate cell list to identify and discard ghost cells before outputting a surviving candidate cell list. The final classification stage circuit 1030 may output the surviving candidate cell list to joint classifier circuit 1040, which may additionally receive the feature information obtained for the surviving candidate cells produced by each of classification stage circuits 1010-1030 and further feature information from external sources. Joint classifier circuit 1040 may then apply the received feature information to perform joint classification on the surviving candidate cell list provided by classification stage circuit 1030. Joint classifier circuit 1040 may be embodied in PHY controller 302 (or alternatively may be embodied separately) as hardware and/or software logic, and may receive the surviving candidate list and feature information from the classification stage circuits 1010-1030, which as previously detailed may be embodied separately or jointly in search engine circuit 306 or PHY controller 302. While three classification stage circuits are shown in FIG. 10, any number of classification stage circuits may be utilized within the scope of the present disclosure.

Parallel classification system 1000 of FIG. 10 may be optimized in several manners, of which one or more may be implemented. Specifically, classification stage circuits 1010-1030 may utilize relatively "weaker" filtering standards than in the sequential hard-filtering case of FIG. 9. In other words, classification stage circuits 1010-1030 may utilize less strict thresholds and other filtering criteria in order to prevent real cells from being discarded while ensuring that obvious ghost cells (weak ghost cells) can still be identified and discarded. As joint classifier circuit 1040 will be configured to render a parallel decision using feature information from all of classification stage circuits 1010-1030, such weak filtering may remain effective.

Additionally and/or alternatively, classification stage circuits 1010-1030 may be sequentially ordered according to increasing complexity, with classification stage circuit 1010 being e.g. the lowest computational complexity and classification stage circuit 1030 being e.g. the highest computational complexity. As each classification stage circuit may be expected to reduce the candidate cell list by discarding any qualifying ghost cells, the surviving candidate cell list passed through the classification stage circuits may gradually be reduced via ghost cell identification and filtering. Accordingly, the final classification stage circuits will evaluate less candidate cells than the initial classification stage circuits. In order to reduce the overall computational complexity, the lowest complexity computation stages may be ordered first while the highest complexity computation stages are ordered last, thus resulting the highest complexity computation stages evaluating reduced quantities of candidate cells. The classification system may thus avoid unnecessary power consumption.

By placing joint classier circuit 1040 after the classification stage circuits, joint classifier circuit 1040 may evaluate only a small quantity of candidate cells. While joint classifier circuit 1040 could be applied to each candidate cell of the initial candidate cell list, such may require excessive computations and thus have a higher power penalty. Accordingly, joint classifier circuit 1040 may operate on only the surviving candidate cells of the classification stage circuits.

Joint classifier circuit 1040 may then evaluate these surviving candidate cells based on the feature information provided by each of the classification stage circuits 1010-1030 for the surviving cells. The feature information may be e.g. probability metrics that indicate the probability of being a real cell or ghost cell or other evaluation metrics obtained by each classification stage circuit. Joint classifier circuit 1040 may thus aggregate the feature information provided by each of classification stage circuits 1010-1030 to classify the surviving cells. As joint classifier 1040 may be able to utilize feature information from different sources, joint classifier 1040 may be able to render a more accurate classification compared to the relatively limited-scope decisions rendered by each of classification circuits 1010-1030 in isolation.

While joint classifier circuit 1040 may be applied to all of the candidate cells of the initial candidate cell list obtained via PSS/SSS detection, such may be increasingly computationally complex. Accordingly, the sequential classification stage circuits 1010-1030 may be used to perform relatively weak filtering to eliminate obvious ghost cells from the initial candidate cell list, thus reducing the initial candidate cell list to a smaller list of surviving candidate cells for joint classifier circuit 1040 to evaluate with joint classification.

Joint classifier circuit 1040 may operate as a support vector machine or other similar linear classifier in order to perform the joint classification operation. For example, each classification stage circuit may provide joint classifier circuit 1040 with one or more feature information metrics (e.g. soft probabilities or other evaluation information) characterizing each surviving cell. Joint classifier circuit 1040 may then treat the feature information metrics for each candidate cell as a vector and subsequently evaluate the vector using a predetermined model for ghost cells and real cells. If a given candidate cell vector satisfies the ghost cell criteria of the model, joint classifier circuit 1040 may classify the corresponding candidate cell as a ghost cell, and may conversely classify the corresponding candidate cell as a real cell if the candidate cell vector satisfies the real cell criteria of the model.

Joint classifier circuit 1040 may obtain the predefined model for cell classification during a training phase, such as during calibration (i.e. prior to runtime). In such a training phase, a large number of example ghost and real cells may be evaluated with classification stage circuits 1010-1030 in order to obtain the resulting feature information for each of the example cells. The feature information for each of the example cells may thus be utilized to define a feature vector for each example cell in a multi-dimensional feature space. As many characteristics of ghost cells such as low SNR, high frequency offset variances, high signal energy, etc. may be common across most or all ghost cells, the resulting example cell feature vectors may be analyzed in order to a identify ghost cell and real cell regions within the multi-dimensional vector space, where the example real cell feature vectors are clustered in the real cell region(s) and the example ghost cell feature vectors are clustered in the ghost cell region(s).

Joint classifier circuit 1040 may then be preconfigured with the defined ghost cell and real cell regions within the multidimensional feature space, where the ghost cell and real cell regions are determined in a calibration training phase. During runtime, joint classifier circuit 1040 may obtain the feature information of each surviving cell from classification stage circuits 1010-1030 and generate the corresponding cell feature vector. Joint classifier circuit 1040 may then apply the predetermined ghost cell and real cell regions to evaluate the resulting feature vector of each surviving candidate cell to determine whether the feature vector falls in the ghost cell or real cell region and subsequently classify the candidate cell accordingly.

Such may be consistent with a support vector machine, which may receive training vectors and generate a separating hyperplane for use in classification. Accordingly, during a calibration stage a separating hyperplane may be generated using training vectors (based on example vectors for real and ghost cells) and subsequently programmed into joint classifier circuit 1040 for use in classification. Joint classifier circuit 1040 may then utilize the separating hyperplane to differentiate between real cells and ghost cells, such as by comparing the cell feature vector for each surviving cell from cell classification circuits 1010-1030 and classifying each cell with a cell feature vector falling on a real cell side of the separating hyperplane (i.e. in the real cell region of the multidimensional feature space) as a real cell and each cell with a cell feature vector falling on a ghost cell side of the separating hyperplane (i.e. in the ghost cell region of the multidimensional feature space) as a ghost cell. Various hyperplane computation algorithms are well-established and may be employed in the calibration stage to generate the separating hyperplane for use by joint classifier circuit 1040.

Assuming independent features and a well-defined boundary between real cell and ghost cells, joint classifier circuit 1040 may accurately classify the surviving candidate cells provided by classification stage circuit 1030. A cost function may be utilized in order to define the boundary between real and ghost cells, in particular where the boundary is not well-defined. Such a cost function may attribute the cost of false alarms (reported ghost cells) vs misdetections (missed real cells) and assign both a cost and probability to each case. The boundary between real and ghost cells may then be placed in order to minimize the cost function, thus allowing joint classifier circuit 1040 to perform suitable classification of the surviving candidate cells.

As joint classifier circuit 1040 may be able to evaluate features from a variety of sources, joint classifier circuit 1040 may effectively distinguish ghost cells from real cells. Furthermore, as classification stage circuits 1010-1030 may be sequentially applied prior to joint classifier circuit 1040, joint classifier circuit 1040 may only need to evaluate a proper subset of the candidate cell list with joint classification and may thus avoid the computational burden and power penalty of evaluating all of the candidate cell list.

As the phase variance calculation of method 400 may be of greater computational intensity than other feature extraction algorithms, such phase variance feature extraction may be placed at a later sequential stage of a sequential classification system (which may precede a joint classifier as shown in FIG. 10). Accordingly, a classification stage circuit implemented in the phase variance evaluation of 406-418 may only need to evaluate a reduced number of candidate surviving cells, thus conserving power and avoiding excessive computation.

As opposed to being preconfigured with the cell classification model, joint classifier circuit 1040 may apply machine learning during runtime in order to dynamically update the cell classification model based on cell classification results, which may include adapting the real cell region(s), the ghost cell region(s), and/or the associated cost functions.

Both method 400 and parallel classification system 1000 may include "bypass" mechanisms to avoid fully evaluating cells that are likely to be strong cells. As previously detailed, search engine circuit 306 may obtain the initial candidate cell list via PSS/SSS detection in 404. Noise and other random channel effects may cause search engine circuit 306 to mistakenly include ghost cells in the candidate cell list during the initial PSS/SSS detection. Accordingly, candidate cells that exhibit low effects of noise may be reasonably expected to be less likely to be ghost cells than candidate cells that exhibit large effects of noise. As a result, search engine circuit 306 may be configured to calculate the SNR (or obtain such a measurement from measurement engine circuit 308) of a candidate cell prior to initiating phase variance evaluation of the candidate cell in 408. Search engine circuit 306 may then compare the SNR to an SNR threshold. If the SNR for the candidate cell is above the SNR threshold, search engine circuit 306 may "bypass" the phase variance evaluation of method 400 and classify the candidate cell as a real cell. If the SNR for the candidate cell is below the SNR threshold, search engine circuit 306 may continue to evaluate the candidate cell according to 408-418. As candidate cells with high SNR may have a low likelihood of being ghost cells (due to the expected minimal effects of noise in initial PSS-SSS detection in 404), search engine circuit 306 may assume that such candidate cells are real cells and avoid the computational and power penalties associated with performing the full phase variance evaluation on such candidate cells. Search engine circuit 306 may thus be configured to calculate the SNR of each candidate cell (e.g. by performing an SNR calculation on SSS symbols as opposed to traditional cell-specific reference signal (CRS) symbols) and subsequently evaluate the calculated SNR prior to 408.

Parallel classification system 1000 may similarly be configured to implement such bypass methods to avoid the computational and power penalties of evaluating excessive quantities of cells. For example, parallel classification system 1000 may similarly obtain the SNR for candidate cells, such as prior to classification stage circuit 1010 (e.g. via CRS-based SNR estimation at measurement engine circuit 308), and subsequently skip evaluation at classification stage circuits 1010-1030 if the SNR for a candidate cell is above an SNR threshold. Parallel classification system 1000 may then evaluate such bypassed candidate cells at joint classifier circuit 1040 or alternatively may additionally bypass joint classifier circuit 1040 and thus declare such high-SNR cells as real cells without further evaluation.

As previously indicated, one of classification stage circuits 1010-1030 may utilize average SNR evaluation as a feature extraction and filtering criteria. Accordingly, parallel classification system 1000 may bypass candidate cells with sufficient SNR that are identified by an SNR averaging classification stage circuit from all or most of any further evaluation within parallel classification system 1000. Accordingly, an SNR averaging classification stage circuit may be placed first in parallel classification system 1000 or may alternatively be placed subsequent to other feature extraction classification stage circuits in order to only bypass candidate cells that are high SNR in addition to the other respective criteria of the preceding feature extraction classification stage circuits. Parallel classification system 1000 may utilize other criteria to bypass candidate cells from all or some of further evaluation within parallel classification system 1000, such as based on a candidate cell producing a feature metric that exceeds a respective feature threshold of any one of classification stage circuits 1010-1030.

In an advantageous aspect of the present disclosure, the phase variance evaluation of method 400 may be embodied in the final classification stage circuit of parallel classification system 1000, and accordingly may provide joint classifier with surviving candidate cells that satisfy the phase variance threshold in addition to any prior feature extraction evaluations employed in any preceding classification stage circuits. Joint classifier circuit 1040 may then perform parallel classification on the surviving candidate cell list provided by the final classification stage circuit with the feature information provided by the final classification stage (e.g. the phase variance v of each surviving candidate cell and/or other evaluation criteria from method 400 such as α, o, p, etc.). Joint classifier circuit 1040 may then classify the surviving candidate cells to produce the final candidate cell list, which may be processed in order to perform mobility procedures such as cell measurement (e.g. at measurement engine circuit 308), measurement reporting, handover, cell selection or reselection, or PLMN selection.

Figure 11:
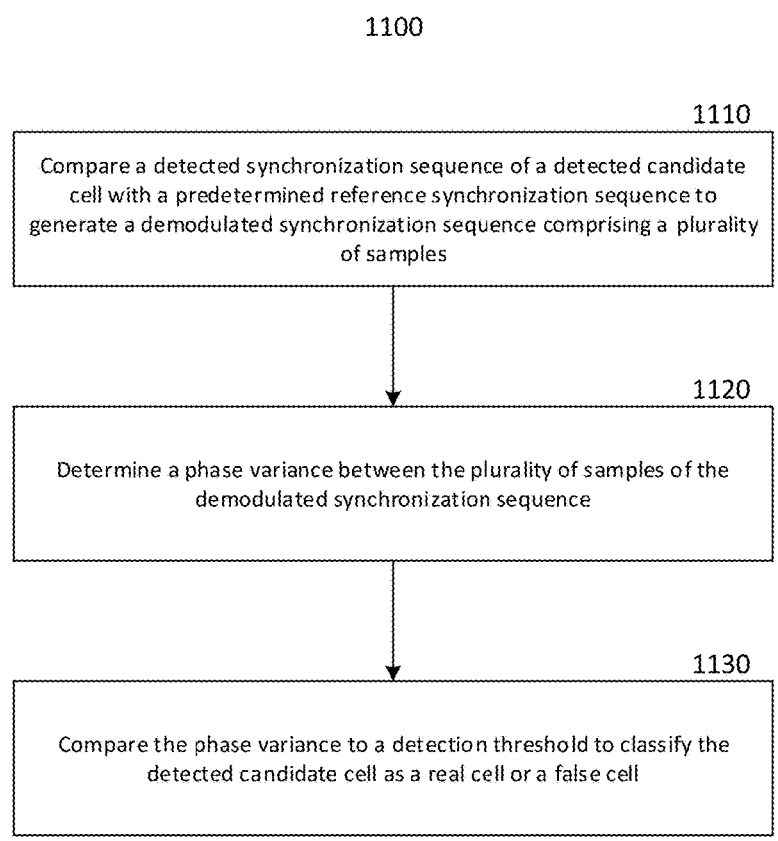
FIG. 11 shows a method of detecting cells.

FIG. 11 shows method 1000 of detecting cells. As shown in FIG. 11, method 1100 includes comparing a detected synchronization sequence of a detected candidate cell with a predetermined reference synchronization sequence to generate a demodulated synchronization sequence including a plurality of samples (1110), determining a phase variance between the plurality of samples of the demodulated synchronization sequence (1120), and comparing the phase variance to a detection threshold to classify the detected candidate cell as a real cell or a false cell (1130).

Figure 12:
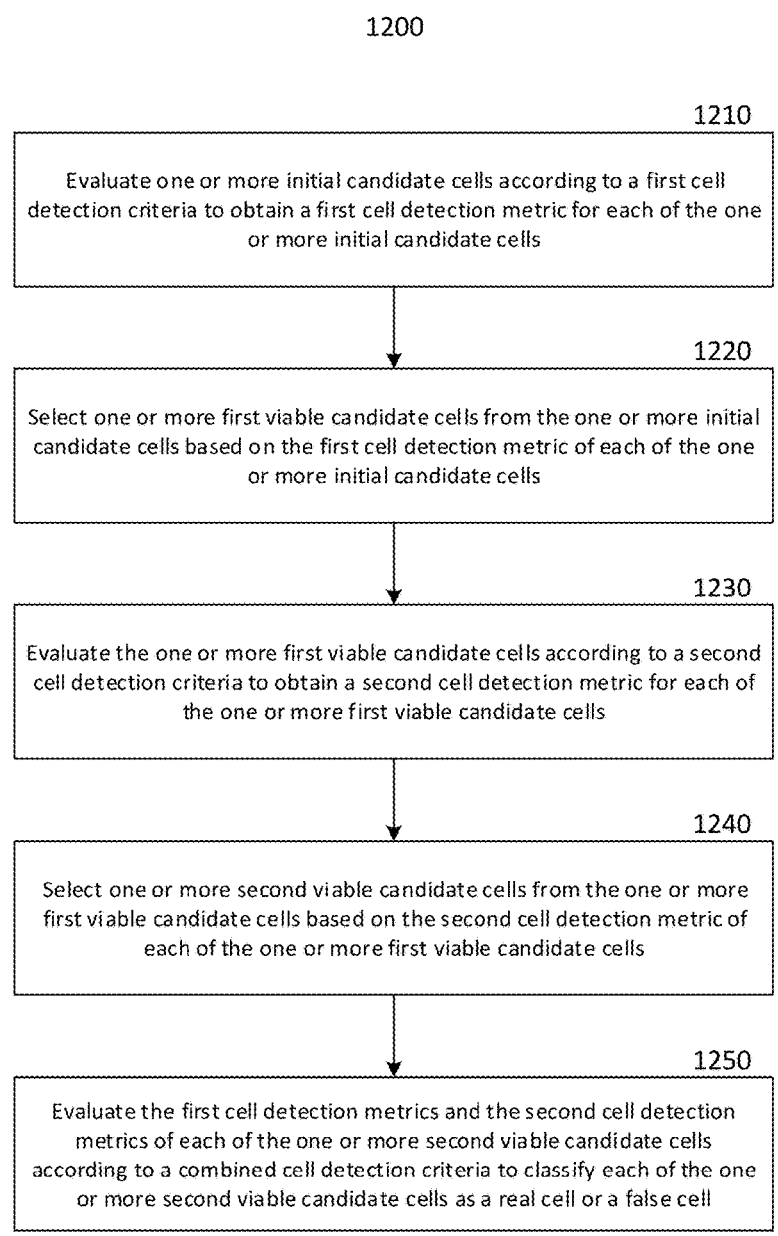
FIG. 12 shows a method of performing cell detection.

FIG. 12 shows method 1200 of performing cell detection. As shown in FIG. 12, method 1200 includes evaluating one or more initial candidate cells according to a first cell detection criteria to obtain a first cell detection metric for each of the one or more initial candidate cells (1210), selecting one or more first viable candidate cells from the one or more initial candidate cells based on the first cell detection metric of each of the one or more initial candidate cells (1220), evaluating the one or more first viable candidate cells according to a second cell detection criteria to obtain a second cell detection metric for each of the one or more first viable candidate cells (1230), selecting one or more second viable candidate cells from the one or more first viable candidate cells based on the second cell detection metric of each of the one or more first viable candidate cells (1240), and evaluating the first cell detection metrics and the second cell detection metrics of each of the one or more second viable candidate cells according to a combined cell detection criteria to classify each of the one or more second viable candidate cells as a real cell or a false cell (1250).

In one or more further exemplary aspects of the disclosure, one or more of the features described above in reference to FIGS. 1-10 may be further incorporated into method 1100 and/or 1200. In particular, method 1100 may be configured to perform further and/or alternate processes as detailed regarding mobile terminal 102 and/or baseband modem 206.

The terms "user equipment", "UE", "mobile terminal", "user terminal", etc., may apply to any wireless communication device, including cellular phones, tablets, laptops, personal computers, wearables, multimedia playback devices, consumer/home appliances, vehicles, etc., and any number of additional electronic devices capable of wireless communications.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

The following examples pertain to further aspects of the disclosure:

Example 1 is a method of detecting cells, the method including comparing a detected synchronization sequence of a detected candidate cell with a predetermined reference synchronization sequence to generate a demodulated synchronization sequence including a plurality of samples, determining a phase variance between the plurality of samples of the demodulated synchronization sequence, and comparing the phase variance to a detection threshold to classify the detected candidate cell as a real cell or a false cell.

In Example 2, the subject matter of Example 1 can optionally further include receiving signal data, and performing cell detection on the signal data to identify an initial candidate cell list including the detected candidate cell.

In Example 3, the subject matter of Example 2 can optionally further include generating a demodulated synchronization sequence for each detected candidate cell of the initial candidate cell list, and classifying each detected candidate cell of the initial candidate cell list as a real cell or a false cell based on a phase variance of a plurality of samples of each demodulated synchronization sequence.

In Example 4, the subject matter of Example 1 can optionally further include receiving signal data, and processing the signal data to identify the detected candidate cell.

In Example 5, the subject matter of Example 4 can optionally include wherein processing the downlink signal data to identify the detected candidate cell includes performing a comparison between the signal data and each of a plurality of predetermined reference synchronization sequences to identify the detected candidate cell.

In Example 6, the subject matter of Example 5 can optionally further include identifying the predetermined reference sequence from the plurality of predetermined reference synchronization sequences based on the comparison.

In Example 7, the subject matter of Example 5 or 6 can optionally include wherein the comparison is a cross-correlation.

In Example 8, the subject matter of any one of Examples 5 to 7 can optionally include wherein comparing the signal data to each of the plurality of predetermined reference synchronization sequences to identify the detected candidate cell includes for each respective predetermined reference synchronization sequence of the plurality of predetermined reference synchronization sequences, determining a cross-correlation between the signal data and the respective predetermined reference synchronization sequence, and identifying the detected candidate cell based on the cross-correlation for each of the plurality of predetermined reference synchronization sequences.

In Example 9, the subject matter of any one of Examples 5 to 8 can optionally include wherein the plurality of predetermined reference synchronization sequences include at least one of a Primary Synchronization Signal (PSS) or a Secondary Synchronization Signal (SSS).

In Example 10, the subject matter of any one of Examples 1 to 9 can optionally include wherein comparing the detected synchronization sequence of the detected candidate cell with the predetermined reference synchronization sequence to generate the demodulated synchronization sequence includes determining the entrywise product of a plurality of samples of the detected synchronization sequence and a plurality of samples of the predetermined reference synchronization sequence to obtain the plurality of samples of the demodulated synchronization sequence.

In Example 11, the subject matter of any one of Examples 1 to 10 can optionally include wherein comparing the detected synchronization sequence of the detected candidate cell with the predetermined reference synchronization sequence to generate the demodulated synchronization sequence includes demodulating the detected synchronization sequence with the predetermined reference synchronization sequence to obtain an initial demodulated synchronization sequence including a plurality of samples, and performing phase alignment on the plurality of samples of the initial demodulated synchronization sequence to generate the plurality of samples of the demodulated synchronization sequence.

In Example 12, the subject matter of Example 11 can optionally include wherein performing phase alignment on the plurality of samples of the initial demodulated synchronization sequence to generate the plurality of samples of the demodulated synchronization sequence includes removing a constant frequency offset from the plurality of samples of the initial demodulated synchronization sequence to generate the plurality of samples of the demodulated synchronization sequence.

In Example 13, the subject matter of Example 11 or 12 can optionally include wherein performing phase alignment on the plurality of samples of the initial demodulated synchronization sequence to generate the plurality of samples of the demodulated synchronization sequence includes removing a linearly varying frequency offset from the plurality of samples of the initial demodulated synchronization sequence to generate the plurality of samples of the demodulated synchronization sequence.

In Example 14, the subject matter of Example 11 can optionally include wherein demodulating the detected synchronization sequence to obtain the initial demodulated synchronization sequence including the plurality of samples includes determining the entrywise product of the detected synchronization sequence and the predetermined reference synchronization sequence to obtain the plurality of samples of the initial demodulated synchronization sequence.

In Example 15, the subject matter of any one of Examples 1 to 14 can optionally include wherein the predetermined synchronization sequence is a predetermined pseudorandom sequence.

In Example 16, the subject matter of any one of Examples 1 to 15 can optionally include wherein the predetermined synchronization sequence is composed of two interleaved pseudorandom noise sequences.

In Example 17, the subject matter of any one of Examples 1 to 16 can optionally include wherein the predetermined synchronization sequence is a Secondary Synchronization Sequence (SSS).

In Example 18, the subject matter of any one of Examples 1 to 17 can optionally include wherein determining the phase variance between the plurality samples of the demodulated synchronization sequence includes determining the angle of each of the plurality of samples of the demodulated synchronization sequence to obtain a plurality of angles, and determining a variance of the plurality of angles to obtain the phase variance.

In Example 19, the subject matter of any one of Examples 1 to 18 can optionally include wherein comparing the phase variance to the detection threshold to classify the detected candidate cell as a real cell or a false cell includes classifying the detected candidate cell as a real cell if the phase variance is less than the detection threshold, or classifying the detected candidate cell as a false cell if the phase variance is greater than the detection threshold.

In Example 20, the subject matter of any one of Examples 1 to 19 can optionally further include performing a radio measurement on the detected candidate cell if the detected candidate cell is classified as a real cell.

In Example 21, the subject matter of any one of Examples 1 to 20 can optionally further include performing one or more of cell selection, cell reselection, handover, cell measurement, or network selection with the detected cell if the detected candidate cell is classified as a real cell.

Example 22 is a non-transitory computer readable medium storing instructions that when executed by a processor of a communication device direct the communication device to perform the method of any one of Examples 1 to 21.

Example 23 is a non-transitory computer readable medium storing instructions that when executed by a processor direct the processor to perform the method of any one of Examples 1 to 21.

Example 24 is a communication device configured to perform the method of any one of Examples 1 to 21.

Example 25 is a communication circuit configured to perform the method of any one of Examples 1 to 21.

Example 26 is a method of performing cell detection, the method including evaluating one or more initial candidate cells according to a first cell detection criteria to obtain a first cell detection metric for each of the one or more initial candidate cells, selecting one or more first viable candidate cells from the one or more initial candidate cells based on the first cell detection metric of each of the one or more initial candidate cells, evaluating the one or more first viable candidate cells according to a second cell detection criteria to obtain a second cell detection metric for each of the one or more first viable candidate cells, selecting one or more second viable candidate cells from the one or more first viable candidate cells based on the second cell detection metric of each of the one or more first viable candidate cells, and evaluating the first cell detection metrics and the second cell detection metrics of each of the one or more second viable candidate cells according to a combined cell detection criteria to classify each of the one or more second viable candidate cells as a real cell or a false cell.

In Example 27, the subject matter of Example 26 can optionally include wherein the first cell detection criteria and the second cell detection criteria are different cell detection criteria selected from a group consisting of a demodulated synchronization sequence phase variance detection criteria, a signal-to-noise ratio (SNR) detection criteria, a frequency offset detection criteria, and a filtered synchronization sequence signal energy detection criteria.

In Example 28, the subject matter of Example 26 or 27 can optionally include wherein the first cell detection metric or the second cell detection metric is one of a demodulated synchronization sequence phase variance, a signal-to-noise ratio, a frequency offset, or a filtered synchronization sequence signal energy.

In Example 29, the subject matter of any one of Examples 26 to 28 can optionally further include prior to evaluating the one or more initial candidate cells according to the first cell detection criteria, performing cell detection to detect the one or more initial candidate cells.

In Example 30, the subject matter of Example 29 can optionally include wherein performing cell detection to detect the one or more initial candidate cells includes comparing a received signal to one or more predetermined reference synchronization sequences to identify the one or more initial candidate cells.

In Example 31, the subject matter of Example 30 can optionally include wherein the one or more predetermined reference synchronization sequences include one or more Primary Synchronization Sequences (PSSs) or one or more Secondary Synchronization Sequences (SSSs).

In Example 32, the subject matter of any one of Examples 26 to 31 can optionally further include prior to evaluating the one or more initial candidate cells according to the first cell detection criteria, evaluating the one or more initial candidate cells according to one or more further cell detection criteria to obtain one or more further cell detection metrics for each of the one or more initial candidate cells, wherein evaluating the first cell detection metrics and the second cell detection metrics of each of the one or more second viable candidate cells according to the combined cell detection criteria to classify each of the one or more second viable candidate cells as a real cell or a false cell includes evaluating the first cell detection metrics, the second cell detection metrics, and the one or more further cell detection metrics according to the combined cell detection criteria to classify each of the one or more second viable candidate cells as a real cell or a false cell.

In Example 33, the subject matter of any one of Examples 26 to 32 can optionally include wherein evaluating the first cell detection metrics and the second cell detection metrics of each of the one or more second viable candidate cells according to the combined cell detection criteria to classify each of the one or more second viable candidate cells as a real cell or a false cell includes generating a classification vector for each of the one or more second viable candidate cells, wherein the each classification vector includes the first detection metric and the second detection metric of the corresponding cell of the one or more second viable candidate cells, and classifying each of the one or more second viable candidate cells according to the corresponding classification vector.

In Example 34, the subject matter of Example 33 can optionally include wherein classifying each of the one or more second viable candidate cells according to the corresponding classification vector includes comparing the classification vector of each of the one or more second viable candidate cells to a predetermined cell model to determine whether each of the one or more second viable candidate cells is a real cell or ghost cell according to the predetermined cell model.

In Example 35, the subject matter of Example 34 can optionally include wherein comparing the classification vector of each of the one or more second viable candidate cells to the predetermined cell model to determine whether each of the one or more second viable candidate cells is a real cell or ghost cell according to the predetermined cell model includes comparing the classification vector of each of the one or more second viable candidate cells to a classification hyperplane to identify whether the classification vector falls within a ghost cell region of the predetermined cell model or a real cell region of the predetermined cell model.

In Example 36, the subject matter of any one of Examples 26 to 35 can optionally include wherein evaluating the one or more initial candidate cells according to the first cell detection criteria to obtain the first cell detection metric for each of the one or more initial candidate cells includes evaluating a received signal to determine the first cell detection metric for each of the one or more initial candidate cells.

In Example 37, the subject matter of Example 36 can optionally include wherein selecting the one or more first viable candidate cells from the one or more initial candidate cells based on the first cell detection metric of each of the one or more initial candidate cells includes comparing the first cell detection metric of each of the one or more initial candidate cells to the first cell detection criteria, and selecting exclusively the cells of the one or more initial candidate cells that have first cell detection metrics that satisfy the first cell detection criteria as the one or more first viable candidate cells.

In Example 38, the subject matter of Example 36 can optionally include wherein the first cell detection criteria is a first detection threshold, and wherein selecting the one or more first viable candidate cells from the one or more initial candidate cells based on the first cell detection metric of each of the one or more initial candidate cells includes comparing the first cell detection metric of each of the one or more initial candidate cells to the first detection threshold, and selecting the one or more first viable candidate cells based on whether the first cell detection metric of each of the one or more initial candidate cells exceeds the first detection threshold.

In Example 39, the subject matter of any one of Examples 26 to 38 can optionally include wherein evaluating the first cell detection metrics and the second cell detection metrics of each of the one or more second viable candidate cells according to the combined cell detection criteria to classify each of the one or more second viable candidate cells as a real cell or a false cell includes identifying one or more real cells from the one or more second viable candidate cells.

In Example 40, the subject matter of Example 39 can optionally include wherein the one or more real cells are a proper subset of the one or more second viable candidate cells.

In Example 41, the subject matter of Example 39 or 40 can optionally further include performing a radio measurement on at least one of the one or more real cells.

In Example 42, the subject matter of Example 39 or 40 can optionally further include performing one or more of cell selection, cell reselection, handover, cell measurement, or network selection with at least one of the one or more real cells.

In Example 43, the subject matter of any one of Examples 26 to 42 can optionally include wherein the one or more first candidate viable cells are a proper subset of the one or more initial candidate cells.

In Example 44, the subject matter of Example 43 can optionally include wherein the one or more initial candidate cells not included in the one or more first viable candidate cells do not satisfy the first cell detection criteria.

Example 45 is a non-transitory computer readable medium storing instructions that when executed by a processor of a communication device direct the communication device to perform the method of any one of Examples 26 to 45.

Example 46 is a non-transitory computer readable medium storing instructions that when executed by a processor direct the processor to perform the method of any one of Examples 26 to 45.

Example 47 is a communication device configured to perform the method of any one of Examples 26 to 45.

Example 48 is a communication circuit configured to perform the method of any one of Examples 26 to 45.

Example 49 is a communication circuit arrangement including a cell search circuit configured to compare a detected synchronization sequence of a detected candidate cell with a predetermined reference synchronization sequence to generate a demodulated synchronization sequence including a plurality of samples, determine a phase variance between the plurality of samples of the demodulated synchronization sequence, and compare the phase variance to a detection threshold to classify the detected candidate cell as a real cell or a false cell.

In Example 50, the subject matter of Example 49 can optionally further include a control circuit configured to trigger a cell search at the cell search circuit.

In Example 51, the subject matter of Example 50 can optionally further include a control circuit configured to perform one or more of cell selection, cell reselection, handover, cell measurement, or network selection with the detected cell if the detected candidate cell is classified as a real cell.

In Example 52, the subject matter of Example 50 or 51 can optionally include wherein the control circuit and the cell search circuit are embodied in a baseband modem circuit.

In Example 53, the subject matter of Example 49 or 52 can optionally further include a radio transceiver, wherein the communication circuit arrangement is configured as a mobile communication device.

In Example 54, the subject matter of Example 53 can optionally include wherein the radio transceiver is configured to receive signal data, and wherein the cell search circuit is further configured to perform cell detection on the signal data to identify an initial candidate list including the detected candidate cell.

In Example 55, the subject matter of Example 54 can optionally include wherein the cell search circuit is further configured to generate a demodulated synchronization sequence for each detected candidate cell of the initial candidate cell list, and classify each detected candidate cell of the initial candidate cell list as a real cell or a false cell based on a phase variance of a plurality of samples of each demodulated synchronization sequence.

In Example 56, the subject matter of Example 53 can optionally include wherein the radio transceiver is configured to receive signal data, and wherein the cell search circuit is configured to process the signal data to identify the detected candidate cell.

In Example 57, the subject matter of Example 56 can optionally include wherein the cell search circuit is configured to process the signal data to identify the detected candidate cell by performing a comparison between the signal data and each of a plurality of predetermined reference synchronization sequences to identify the detected candidate cell.

In Example 58, the subject matter of Example 57 can optionally include wherein the cell search circuit is further configured to identify the predetermined reference sequence from the plurality of predetermined reference synchronization sequences based on the comparison.

In Example 59, the subject matter of Example 57 or 58 can optionally include wherein the comparison is a cross-correlation.

In Example 60, the subject matter of Example 57 can optionally include wherein the cell search circuit is configured to compare the signal data to each of the plurality of predetermined reference synchronization sequences to identify the detected candidate cell by for each respective predetermined reference synchronization sequence of the plurality of predetermined reference synchronization sequences, determining a cross-correlation between the signal data and the respective predetermined reference synchronization sequence, and identifying the detected candidate cell based on the cross-correlation for each of the plurality of predetermined reference synchronization sequences.

In Example 61, the subject matter of any one of Examples 57 to 60 can optionally include wherein the plurality of predetermined reference synchronization sequences include at least one of a Primary Synchronization Signal (PSS) or a Secondary Synchronization Signal (SSS).

In Example 62, the subject matter of any one of Examples 49 to 61 can optionally include wherein the cell search circuit is configured to compare the detected synchronization sequence of the detected candidate cell with the predetermined reference synchronization sequence to generate the demodulated synchronization sequence by determining the entrywise product of a plurality of samples of the detected synchronization sequence and a plurality of samples of the predetermined reference synchronization sequence to obtain the plurality of samples of the demodulated synchronization sequence.

In Example 63, the subject matter of any one of Examples 49 to 62 can optionally include wherein the cell search circuit is configured to compare the detected synchronization sequence of the detected candidate cell with the predetermined reference synchronization sequence to generate the demodulated synchronization sequence by demodulating the detected synchronization sequence with the predetermined reference synchronization sequence to obtain an initial demodulated synchronization sequence including a plurality of samples, and performing phase alignment on the plurality of samples of the initial demodulated synchronization sequence to generate the plurality of samples of the demodulated synchronization sequence.

In Example 64, the subject matter of Example 63 can optionally include wherein the cell search circuit is configured to perform performing phase alignment on the plurality of samples of the initial demodulated synchronization sequence to generate the plurality of samples of the demodulated synchronization sequence by removing a constant frequency offset from the plurality of samples of the initial demodulated synchronization sequence to generate the plurality of samples of the demodulated synchronization sequence.

In Example 65, the subject matter of Example 63 or 64 can optionally include wherein the cell search circuit is configured to perform performing phase alignment on the plurality of samples of the initial demodulated synchronization sequence to generate the plurality of samples of the demodulated synchronization sequence by removing a linearly varying frequency offset from the plurality of samples of the initial demodulated synchronization sequence to generate the plurality of samples of the demodulated synchronization sequence.

In Example 66, the subject matter of any one of Examples 63 to 65 can optionally include wherein the cell search circuit is configured to demodulate the detected synchronization sequence to obtain the initial demodulated synchronization sequence including the plurality of samples by determining the entrywise product of the detected synchronization sequence and the predetermined reference synchronization sequence to obtain the plurality of samples of the initial demodulated synchronization sequence.

In Example 67, the subject matter of any one of Examples 49 to 66 can optionally include wherein the predetermined synchronization sequence is a predetermined pseudorandom sequence.

In Example 68, the subject matter of any one of Examples 49 to 67 can optionally include wherein the predetermined synchronization sequence is composed of two interleaved pseudorandom sequences.

In Example 69, the subject matter of any one of Examples 49 to 68 can optionally include wherein the predetermined synchronization sequence is a Secondary Synchronization Sequence (SSS).

In Example 70, the subject matter of any one of Examples 49 to 69 can optionally include wherein the cell search circuit is configured to determine the phase variance between the plurality of samples of the demodulated synchronization sequence by determining the angle of each of the plurality of samples of the demodulated synchronization sequence to obtain a plurality of angles, and determining a variance of the plurality of angles to obtain the phase variance.

In Example 71, the subject matter of any one of Examples 49 to 70 can optionally include wherein the cell search circuit is configured to compare the phase variance to the detection threshold to classify the detected candidate cell as a real cell or a false cell includes classifying the detected candidate cell as a real cell if the phase variance is less than the detection threshold, or classifying the detected candidate cell as a false cell if the phase variance is greater than the detection threshold.

In Example 72, the subject matter of any one of Examples 49 to 72 can optionally further include a measurement circuit configured to perform radio measurement on the detected candidate cell if the detected candidate cell is classified as a real cell.

Example 73 is a cell detection circuit arrangement including a first cell classification circuit configured to evaluate one or more initial candidate cells according to a first cell detection criteria to obtain a first cell detection metric for each of the one or more initial candidate cells and configured to select one or more first viable candidate cells from the one or more initial candidate cells based on the first cell detection metric of each of the one or more initial candidate cells, a second cell classification circuit configured to evaluate the one or more first viable candidate cells according to a second cell detection criteria to obtain a second cell detection metric for each of the one or more first viable candidate cells and configured to select one or more second viable candidate cells from the one or more first viable candidate cells based on the second cell detection metric of each of the one or more first viable candidate cells, and a joint cell classification circuit configured to evaluate the first cell detection metrics and the second cell detection metrics of each of the one or more second viable candidate cells to classify each of the one or more second viable candidate cells as a real cell or a false cell.

In Example 74, the subject matter of Example 73 can optionally include wherein the first cell detection criteria and the second cell detection criteria are different cell detection criteria selected from a group consisting of a demodulated synchronization sequence phase variance detection criteria, a signal-to-noise ratio (SNR) detection criteria, a frequency offset detection criteria, and a filtered synchronization sequence signal energy detection criteria.

In Example 75, the subject matter of Example 73 or 74 can optionally include the first cell detection metric or the second cell detection metric is one of a demodulated synchronization sequence phase variance, a signal-to-noise ratio, a frequency offset, or a filtered synchronization sequence signal energy.

In Example 76, the subject matter of any one of Examples 73 to 75 can optionally further include a cell detection circuit configured to perform cell detection to detect the one or more initial candidate cells prior to the first cell classification circuit evaluating the one or more initial candidate cells according to the first cell detection criteria.

In Example 77, the subject matter of Example 76 can optionally include wherein the cell detection circuit is configured to perform cell detection to detect the one or more initial candidate cells by comparing a received signal to one or more predetermined reference synchronization sequences to identify the one or more initial candidate cells.

In Example 78, the subject matter of Example 77 can optionally include wherein the one or more predetermined reference synchronization sequences include one or more Primary Synchronization Sequences (PSSs) or one or more Secondary Synchronization Sequences (SSSs).

In Example 79, the subject matter of any one of Examples 73 to 78 can optionally further include one or more further cell classification circuits configured to evaluate the one or more initial candidate cells according to one or more further cell detection criteria to obtain one or more further cell detection metrics for each of the one or more initial candidate cells prior to the first cell classification circuit evaluating the one or more initial candidate cells according to the first cell detection criteria, and wherein the joint cell classification circuit is configured to evaluate the first cell detection metrics and the second cell detection metrics of each of the one or more second viable candidate cells according to the combined cell detection criteria to classify each of the one or more second viable candidate cells as a real cell or a false cell by evaluating the first cell detection metrics, the second cell detection metrics, and the one or more further cell detection metrics according to the combined cell detection criteria to classify each of the one or more second viable candidate cells as a real cell or a false cell.

In Example 80, the subject matter of any one of Examples 73 to 79 can optionally include wherein the joint cell classification circuit is configured to evaluate the first cell detection metrics and the second cell detection metrics of each of the one or more second viable candidate cells according to the combined cell detection criteria to classify each of the one or more second viable candidate cells as a real cell or a false cell by generating a classification vector for each of the one or more second viable candidate cells, wherein the each classification vector includes the first detection metric and the second detection metric of the corresponding cell of the one or more second viable candidate cells, and classifying each of the one or more second viable candidate cells according to the corresponding classification vector.

In Example 81, the subject matter of Example 80 can optionally include wherein the joint cell classification circuit is configured to classify each of the one or more second viable candidate cells according to the corresponding classification vector by comparing the classification vector of each of the one or more second viable candidate cells to a predetermined cell model to determine whether each of the one or more second viable candidate cells is a real cell or ghost cell according to the predetermined cell model.

In Example 82, the subject matter of Example 81 can optionally include wherein the joint cell classification circuit is configured to compare the classification vector of each of the one or more second viable candidate cells to the predetermined cell model to determine whether each of the one or more second viable candidate cells is a real cell or ghost cell according to the predetermined cell model by comparing the classification vector of each of the one or more second viable candidate cells to a classification hyperplane to identify whether the classification vector falls within a ghost cell region of the predetermined cell model or a real cell region of the predetermined cell model.

In Example 83, the subject matter of any one of Examples 73 to 82 can optionally include wherein the first cell classification circuit is configured to evaluate the one or more initial candidate cells according to the first cell detection criteria to obtain the first cell detection metric for each of the one or more initial candidate cells by evaluating a received signal to determine the first cell detection metric for each of the one or more initial candidate cells.

In Example 84, the subject matter of Example 83 can optionally include wherein the first cell classification circuit is configured to select the one or more first viable candidate cells from the one or more initial candidate cells based on the first cell detection metric of each of the one or more initial candidate cells by comparing the first cell detection metric of each of the one or more initial candidate cells to the first cell detection criteria, and selecting exclusively the cells of the one or more initial candidate cells that have first cell detection metrics that satisfy the first cell detection criteria as the one or more first viable candidate cells.

In Example 85, the subject matter of Example 83 can optionally include wherein the first cell detection criteria is a first detection threshold, and wherein the first cell classification circuit is configured to select the one or more first viable candidate cells from the one or more initial candidate cells based on the first cell detection metric of each of the one or more initial candidate cells by comparing the first cell detection metric of each of the one or more initial candidate cells to the first detection threshold, and selecting the one or more first viable candidate cells based on whether the first cell detection metric of each of the one or more initial candidate cells exceeds the first detection threshold.

In Example 86, the subject matter of any one of Examples 73 to 85 can optionally include wherein the joint cell classification circuit is configured to evaluate the first cell detection metrics and the second cell detection metrics of each of the one or more second viable candidate cells according to the combined cell detection criteria to classify each of the one or more second viable candidate cells as a real cell or a false cell by identifying one or more real cells from the one or more second viable candidate cells.

In Example 87, the subject matter of Example 86 can optionally include wherein the one or more real cells are a proper subset of the one or more second viable candidate cells.

In Example 88, the subject matter of Example 86 or 87 can optionally further include a measurement circuit configured to perform a radio measurement on at least one of the one or more real cells.

In Example 89, the subject matter of Example 86 or 87 can optionally further include a control circuit configured to perform one or more of cell selection, cell reselection, handover, cell measurement, or network selection with at least one of the one or more real cells.

In Example 90, the subject matter of any one of Examples 73 to 89 can optionally include wherein the one or more first candidate viable cells are a proper subset of the one or more initial candidate cells.

In Example 91, the subject matter of Example 90 can optionally include wherein the one or more initial candidate cells not included in the one or more first viable candidate cells do not satisfy the first cell detection criteria.

Example 92 is a communication device including the cell detection circuit arrangement of any one of Examples 73 to 91.

In Example 93, the subject matter of Example 92 can optionally further include a radio transceiver.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication circuit arrangement comprising:
  a cell search circuit configured to:
    compare a detected synchronization sequence of a detected candidate cell with a predetermined reference synchronization sequence to generate a demodulated synchronization sequence comprising a plurality of samples;
    determine a phase variance between the plurality of samples of the demodulated synchronization sequence; and
    compare the phase variance to a detection threshold to classify the detected candidate cell as a real cell or a false cell.

2. The communication circuit arrangement of claim 1, further comprising a control circuit configured to perform one or more of cell selection, cell reselection, handover, cell measurement, or network selection with the detected cell if the detected candidate cell is classified as a real cell.

3. The communication circuit arrangement of claim 1, further comprising a radio transceiver, wherein the communication circuit arrangement is configured as a mobile communication device.

4. The communication circuit arrangement of claim 3, wherein the radio transceiver is configured to receive signal data, and wherein the cell search circuit is further configured to perform cell detection on the signal data to identify an initial candidate list comprising the detected candidate cell.

5. The communication circuit arrangement of claim 4, wherein the cell search circuit is further configured to:
generate a demodulated synchronization sequence for each detected candidate cell of the initial candidate cell list; and
classify each detected candidate cell of the initial candidate cell list as a real cell or a false cell based on a phase variance of a plurality of samples of each demodulated synchronization sequence.

6. The communication circuit arrangement of claim 3, wherein the radio transceiver is configured to receive signal data, and wherein the cell search circuit is configured to process the signal data to identify the detected candidate cell.

7. The communication circuit arrangement of claim 6, wherein the cell search circuit is configured to process the signal data to identify the detected candidate cell by:
performing a comparison between the signal data and each of a plurality of predetermined reference synchronization sequences to identify the detected candidate cell.

8. The communication circuit arrangement of claim 7, wherein the cell search circuit is further configured to:
identify the predetermined reference sequence from the plurality of predetermined reference synchronization sequences based on the comparison.

9. The communication circuit arrangement of claim 7, wherein the plurality of predetermined reference synchronization sequences comprise at least one of a Primary Synchronization Signal (PSS) or a Secondary Synchronization Signal (SSS).

10. The communication circuit arrangement of claim 1, wherein the cell search circuit is configured to compare the detected synchronization sequence of the detected candidate cell with the predetermined reference synchronization sequence to generate the demodulated synchronization sequence by:
demodulating the detected synchronization sequence with the predetermined reference synchronization sequence to obtain an initial demodulated synchronization sequence comprising a plurality of samples; and
performing phase alignment on the plurality of samples of the initial demodulated synchronization sequence to generate the plurality of samples of the demodulated synchronization sequence.

11. The communication circuit arrangement of claim 10, wherein the cell search circuit is configured to demodulate the detected synchronization sequence to obtain the initial demodulated synchronization sequence comprising the plurality of samples by:
determining the entrywise product of the detected synchronization sequence and the predetermined reference synchronization sequence to obtain the plurality of samples of the initial demodulated synchronization sequence.

12. The communication circuit arrangement of claim 1, wherein the predetermined synchronization sequence is a Secondary Synchronization Sequence (SSS).

13. The communication circuit arrangement of claim 1, wherein the cell search circuit is configured to compare the phase variance to the detection threshold to classify the detected candidate cell as a real cell or a false cell comprises:
classifying the detected candidate cell as a real cell if the phase variance is less than the detection threshold; or
classifying the detected candidate cell as a false cell if the phase variance is greater than the detection threshold.

14. A method of detecting cells, the method comprising:
comparing a detected synchronization sequence of a detected candidate cell with a predetermined reference synchronization sequence to generate a demodulated synchronization sequence comprising a plurality of samples;
determining a phase variance between the plurality of samples of the demodulated synchronization sequence; and
comparing the phase variance to a detection threshold to classify the detected candidate cell as a real cell or a false cell.

15. The method of claim 14, wherein comparing the detected synchronization sequence of the detected candidate cell with the predetermined reference synchronization sequence to generate the demodulated synchronization sequence comprises:
demodulating the detected synchronization sequence with the predetermined reference synchronization sequence to obtain an initial demodulated synchronization sequence comprising a plurality of samples; and
performing phase alignment on the plurality of samples of the initial demodulated synchronization sequence to generate the plurality of samples of the demodulated synchronization sequence.

16. A cell detection circuit arrangement comprising:
a first cell classification circuit configured to:
evaluate one or more initial candidate cells according to a first cell detection criteria to obtain a first cell detection metric for each of the one or more initial candidate cells and configured to select one or more first viable candidate cells from the one or more initial candidate cells based on the first cell detection metric of each of the one or more initial candidate cells;
a second cell classification circuit configured to evaluate the one or more first viable candidate cells according to a second cell detection criteria to obtain a second cell detection metric for each of the one or more first viable candidate cells and configured to select one or more second viable candidate cells from the one or more first viable candidate cells based on the second cell detection metric of each of the one or more first viable candidate cells; and
a joint cell classification circuit configured to evaluate the first cell detection metrics and the second cell detection metrics of each of the one or more second viable candidate cells to classify each of the one or more second viable candidate cells as a real cell or a false cell.

17. The cell detection circuit arrangement of claim 16, wherein the first cell detection criteria and the second cell detection criteria are different cell detection criteria selected from a group consisting of a demodulated synchronization sequence phase variance detection criteria, a signal-to-noise ratio (SNR) detection criteria, a frequency offset detection criteria, and a filtered synchronization sequence signal energy detection criteria.

18. The cell detection circuit arrangement of claim 16, further comprising a cell detection circuit configured to perform cell detection to detect the one or more initial candidate cells prior to the first cell classification circuit evaluating the one or more initial candidate cells according to the first cell detection criteria.

19. The cell detection circuit arrangement of claim 16, further comprising:
one or more further cell classification circuits configured to evaluate the one or more initial candidate cells according to one or more further cell detection criteria to obtain one or more further cell detection metrics for each of the one or more initial candidate cells prior to the first cell classification circuit evaluating the one or more initial candidate cells according to the first cell detection criteria,
and wherein the joint cell classification circuit is configured to evaluate the first cell detection metrics and the second cell detection metrics of each of the one or more second viable candidate cells according to the combined cell detection criteria to classify each of the one or more second viable candidate cells as a real cell or a false cell by:
evaluating the first cell detection metrics, the second cell detection metrics, and the one or more further cell detection metrics according to the combined cell detection criteria to classify each of the one or more second viable candidate cells as a real cell or a false cell.

20. The cell detection circuit arrangement of claim 16, wherein the joint cell classification circuit is configured to evaluate the first cell detection metrics and the second cell detection metrics of each of the one or more second viable candidate cells according to the combined cell detection criteria to classify each of the one or more second viable candidate cells as a real cell or a false cell by:
generating a classification vector for each of the one or more second viable candidate cells, wherein the each classification vector comprises the first detection metric and the second detection metric of the corresponding cell of the one or more second viable candidate cells; and
classifying each of the one or more second viable candidate cells according to the corresponding classification vector.

21. The cell detection circuit arrangement of claim 20, wherein the joint cell classification circuit is configured to classify each of the one or more second viable candidate cells according to the corresponding classification vector by:
comparing the classification vector of each of the one or more second viable candidate cells to a predetermined cell model to determine whether each of the one or more second viable candidate cells is a real cell or ghost cell according to the predetermined cell model.

22. The cell detection circuit arrangement of claim 21, wherein the joint cell classification circuit is configured to compare the classification vector of each of the one or more second viable candidate cells to the predetermined cell model to determine whether each of the one or more second viable candidate cells is a real cell or ghost cell according to the predetermined cell model by:
comparing the classification vector of each of the one or more second viable candidate cells to a classification hyperplane to identify whether the classification vector falls within a ghost cell region of the predetermined cell model or a real cell region of the predetermined cell model.

23. The cell detection circuit arrangement of claim 16, wherein the joint cell classification circuit is configured to evaluate the first cell detection metrics and the second cell detection metrics of each of the one or more second viable candidate cells according to the combined cell detection criteria to classify each of the one or more second viable candidate cells as a real cell or a false cell by:
identifying one or more real cells from the one or more second viable candidate cells.

24. The cell detection circuit arrangement of claim 23, further comprising a control circuit configured to perform one or more of cell selection, cell reselection, handover, cell measurement, or network selection with at least one of the one or more real cells.

25. A method of performing cell detection, the method comprising:
evaluating one or more initial candidate cells according to a first cell detection criteria to obtain a first cell detection metric for each of the one or more initial candidate cells;
selecting one or more first viable candidate cells from the one or more initial candidate cells based on the first cell detection metric of each of the one or more initial candidate cells;
evaluating the one or more first viable candidate cells according to a second cell detection criteria to obtain a second cell detection metric for each of the one or more first viable candidate cells;
selecting one or more second viable candidate cells from the one or more first viable candidate cells based on the second cell detection metric of each of the one or more first viable candidate cells; and
evaluating the first cell detection metrics and the second cell detection metrics of each of the one or more second viable candidate cells according to a combined cell detection criteria to classify each of the one or more second viable candidate cells as a real cell or a false cell.

* * * * *